US008552907B2

(12) United States Patent
Kanamoto

(10) Patent No.: US 8,552,907 B2
(45) Date of Patent: Oct. 8, 2013

(54) ELECTRONIC SCANNING RADAR APPARATUS, RECEIVING WAVE DIRECTION ESTIMATING METHOD, AND COMPUTER-READABLE STORAGE MEDIA STORING RECEIVING WAVE DIRECTION ESTIMATION PROGRAM

(75) Inventor: Junji Kanamoto, Yokohama (JP)

(73) Assignee: Honda elesys Co., Ltd., Yokohama (JP)

( * ) Notice: Subject to any disclaimer, the term of this patent is extended or adjusted under 35 U.S.C. 154(b) by 211 days.

(21) Appl. No.: 13/110,721

(22) Filed: May 18, 2011

(65) Prior Publication Data

US 2011/0309971 A1 Dec. 22, 2011

(30) Foreign Application Priority Data

May 19, 2010 (JP) .................. 2010-115500

(51) Int. Cl.
*G01S 13/58* (2006.01)
*G01S 13/00* (2006.01)

(52) U.S. Cl.
USPC ............. 342/147; 342/70; 342/149; 342/152; 342/189; 342/192; 342/194

(58) Field of Classification Search
USPC ............. 342/70–72, 107, 113, 147, 149–154, 342/158
See application file for complete search history.

(56) References Cited

U.S. PATENT DOCUMENTS

| | | | | |
|---|---|---|---|---|
| 6,498,581 B1 * | 12/2002 | Yu | ..................................... | 342/90 |
| 6,567,034 B1 * | 5/2003 | Yu | ..................................... | 342/16 |
| 7,474,252 B2 * | 1/2009 | Natsume et al. | ................ | 342/70 |
| 7,495,605 B1 * | 2/2009 | Sakamoto et al. | ............ | 342/118 |
| 7,532,154 B2 * | 5/2009 | Noda | ............................. | 342/107 |
| 7,692,574 B2 * | 4/2010 | Nakagawa | ..................... | 342/107 |
| 7,724,181 B2 * | 5/2010 | Natsume | ....................... | 342/108 |
| 7,907,083 B2 * | 3/2011 | Sakamoto et al. | .............. | 342/70 |

(Continued)

FOREIGN PATENT DOCUMENTS

| | | |
|---|---|---|
| JP | 2006-275840 A | 10/2006 |
| JP | 2007-40806 A | 2/2007 |
| JP | 2009-156582 A | 7/2009 |

OTHER PUBLICATIONS

"MATLAB Multi-media Signal Processing part I: Digital signal fundamentals", Ikehara and Shimamura, Baifukan Co., Ltd., 2004.

(Continued)

*Primary Examiner* — Jack W Keith
*Assistant Examiner* — Peter Bythrow
(74) *Attorney, Agent, or Firm* — Arent Fox LLP

(57) ABSTRACT

In accordance with one of embodiments of the present invention, a frequency resolution processing unit calculates complex number data based on a beat signal caused by a receiving wave coming from a target and a transmission wave. A target detection unit detects a peak value from the intensities of beat frequencies, and then detects an existence of the target. The target link unit makes association between a target detected in the present detecting cycle and the target detected in the past detecting cycle. A direction estimating unit generates a generative complex number data based on the complex number data so as to correspond to a data generation unit. The direction estimating unit calculates, for each antenna, an incoming direction of the receiving wave based on each of normal equations formed by use of the complex number data of the beat frequency which an existence of the target is detected and the generative complex number data.

18 Claims, 31 Drawing Sheets

(56) References Cited

U.S. PATENT DOCUMENTS

| | | | |
|---|---|---|---|
| 8,026,841 B2* | 9/2011 | Liu et al. | 342/33 |
| 8,102,309 B2* | 1/2012 | Nakagawa | 342/147 |
| 8,232,914 B2* | 7/2012 | Kuroda et al. | 342/129 |
| 2001/0015698 A1* | 8/2001 | Tokoro | 342/70 |
| 2003/0085832 A1* | 5/2003 | Yu | 342/16 |
| 2003/0085835 A1* | 5/2003 | Matsui et al. | 342/70 |
| 2003/0112173 A1* | 6/2003 | Seki et al. | 342/70 |
| 2004/0183713 A1* | 9/2004 | Kumon et al. | 342/70 |
| 2005/0261833 A1* | 11/2005 | Brosius et al. | 701/213 |
| 2006/0220945 A1* | 10/2006 | Ohtake et al. | 342/70 |
| 2008/0122681 A1* | 5/2008 | Shirakawa | 342/147 |
| 2009/0040097 A1* | 2/2009 | Sakamoto et al. | 342/118 |
| 2009/0073026 A1* | 3/2009 | Nakagawa | 342/107 |
| 2009/0085796 A1* | 4/2009 | Kuroda et al. | 342/129 |
| 2009/0309784 A1* | 12/2009 | Natsume | 342/189 |
| 2010/0073216 A1* | 3/2010 | Sakamoto et al. | 342/70 |
| 2010/0134343 A1* | 6/2010 | Nakagawa | 342/147 |
| 2012/0274501 A1* | 11/2012 | Kuwahara et al. | 342/147 |

OTHER PUBLICATIONS

"Adaptive Signal Processing Using Array Antennas", Kikuma Nobuyoshi, Kagaku Gijutsu Shyuppan, 1998, pp. 173-174.

T. Shimamura, et al., "Data prediction for the Burg Method", The Institute of Electrics, Information and Communication Engineers Transactions, vol. J77-A, No. 8, Aug. 1994, pp. 1182-1185.

* cited by examiner

FIG. 5

| | PEAK DURING ASCENT → | | | | |
|---|---|---|---|---|---|
| | 1 | 2 | 3 | 4 | 5 |
| 1 | $r_{11}$ | $r_{12}$ | ... | | |
| | $v_{11}$ | $v_{12}$ | | | |
| | $pu_1$ | $pu_2$ | | | |
| | $pd_1$ | $pd_2$ | | | |
| 2 | $r_{21}$ | $r_{22}$ | | | |
| | $v_{21}$ | $v_{22}$ | | | |
| | $pu_1$ | $pu_2$ | | | |
| | $pd_2$ | $pd_2$ | | | |
| 3 | ... | ... | | | |
| 4 | | | | | |
| 5 | | | | | $r_{55}$ |
| | | | | | $v_{55}$ |
| | | | | | $pu_5$ |
| | | | | | $pd_5$ |

(Vertical axis: PEAK DURING DESCENT ↓)

AFTER DBF, THIS MATRIX WILL BE CREATED FOR THE NUMBER OF ANGLES CH

FIG. 6

| TARGET GROUP NUMBER | DISTANCE | RELATIVE VELOCITY | FREQUENCY POINT |
|---|---|---|---|
| TARGET GROUP NUMBER 1 | $r_1$ | $v_1$ | $f_1$ |
| TARGET GROUP NUMBER 2 | $r_2$ | $v_2$ | $f_2$ |
| TARGET GROUP NUMBER 3 | $r_3$ | $v_3$ | $f_3$ |
| TARGET GROUP NUMBER 4 | $r_4$ | $v_4$ | $f_4$ |
| ⋮ | | | |

FIG. 9

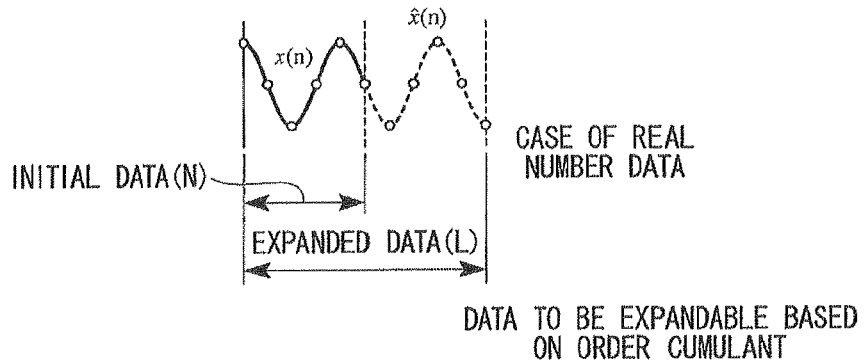

$$\hat{x}(n) = -\sum_{i=1}^{M'} \hat{a}(i)x(n-i) \quad n = N+1, N+2, \cdots, L$$

L: EXPANDED NUMBER OF DATA
M': ORDER CUMULANT AFTER EXPANSION

CASE OF REAL NUMBER DATA

INITIAL DATA(N)
EXPANDED DATA(L)

DATA TO BE EXPANDABLE BASED ON ORDER CUMULANT

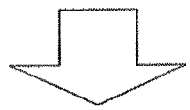

$$\begin{bmatrix} \hat{r}_x(0) & \hat{r}_x(-1) & \cdots & \hat{r}_x(-(M-1)) \\ \hat{r}_x(1) & \hat{r}_x(0) & \cdots & \hat{r}_x(-(M-2)) \\ \vdots & \vdots & \ddots & \vdots \\ \hat{r}_x(M-1) & \hat{r}_x(M-2) & \cdots & \hat{r}_x(0) \end{bmatrix} \begin{bmatrix} \hat{a}_M(1) \\ \hat{a}_M(2) \\ \vdots \\ \hat{a}_M(M) \end{bmatrix} = -\begin{bmatrix} \hat{r}_x(1) \\ \hat{r}_x(2) \\ \vdots \\ \hat{r}_x(M) \end{bmatrix}$$

FIG. 14

|  |  | t(GROUP) | t(ESTIMATION) | t−1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | XC_up |  |  |  |
|  | f_dwn |  |  |  |
|  | XC_dwn |  |  |  |
| TARGET 2 | r |  |  |  |
|  | Long_d |  |  |  |
|  | Late_d |  |  |  |
|  | velo |  |  |  |
|  | f_up |  |  |  |
|  | XC_up |  |  |  |
|  | f_dwn |  |  |  |
|  | XC_dwn |  |  |  |
| ⋮ | ⋮ | ⋮ | ⋮ | ⋮ | r: DISTANCE
Long_d: LONGITUDINAL POSITION
Late_d: LATERAL POSITION
velo: RELATIVE VELOCITY
f_up: PEAK FREQUENCY DURING ASCENT
XC_up: GENERATED DATA AT PEAK FREQUENCY DURING ASCENT
f_dwn: PEAK FREQUENCY DURING DESCENT
XC_dwn: GENERATED DATA AT PEAK FREQUENCY DURING DESCENT

FIG. 17

|  |  | t(GROUP) | t(ESTIMATION) | t−1 | t−2 | t−3 |
|---|---|---|---|---|---|---|
| TARGET 1 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | AR_C_up |  |  |  |  |  |
|  | f_dwn |  |  |  |  |  |
|  | AR_C_dwn |  |  |  |  |  |
| TARGET 2 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | AR_C_up |  |  |  |  |  |
|  | f_dwn |  |  |  |  |  |
|  | AR_C_dwn |  |  |  |  |  |
| ⋮ | ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : PEAK FREQUENCY DURING ASCENT
AR_C_up : AR COEFFICIENT AT PEAK FREQUENCY DURING ASCENT
f_dwn : PEAK FREQUENCY DURING DESCENT
AR_C_dwn : AR COEFFICIENT AT PEAK FREQUENCY DURING DESCENT

FIG. 24

|  |  | t(GROUP) | t(ESTIMATION) | t−1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | AR_C_up |  |  |  |
|  | f_dwn |  |  |  |
|  | AR_C_dwn |  |  |  |
| TARGET 2 | r |  |  |  |
|  | Long_d |  |  |  |
|  | Late_d |  |  |  |
|  | velo |  |  |  |
|  | f_up |  |  |  |
|  | AR_C_up |  |  |  |
|  | f_dwn |  |  |  |
|  | AR_C_dwn |  |  |  |
| ⋮ | ⋮ | ⋮ | ⋮ | ⋮ | r: DISTANCE
Long_d: LONGITUDINAL POSITION
Late_d: LATERAL POSITION
velo: RELATIVE VELOCITY
f_up: PEAK FREQUENCY DURING ASCENT
AR_C_up: AR COEFFICIENT AT PEAK FREQUENCY DURING ASCENT
f_dwn: PEAK FREQUENCY DURING DESCENT
AR_C_dwn: AR COEFFICIENT AT PEAK FREQUENCY DURING DESCENT

FIG. 25A

ASCENT

|  | ANGLE 1 | ANGLE 2 | ... | FREQUENCY POINT |
|---|---|---|---|---|
| TARGET GROUP NUMBER 1 | $t_1\_ang_1$ | $t_1\_ang_2$ |  | $f_1$ |
| TARGET GROUP NUMBER 2 | $t_2\_ang_1$ | $t_2\_ang_2$ |  | $f_2$ |
| TARGET GROUP NUMBER 3 | $t_3\_ang_1$ | $t_3\_ang_2$ |  | $f_3$ |
| TARGET GROUP NUMBER 4 | $t_4\_ang_1$ | $t_4\_ang_2$ |  | $f_4$ |
| ⋮ |  |  |  |  |

FIG. 25B

DESCENT

|  | ANGLE 1 | ANGLE 2 | ... | FREQUENCY POINT |
|---|---|---|---|---|
| TARGET GROUP NUMBER 1 | $t_1\_ang_1$ | $t_1\_ang_2$ |  | $f_1$ |
| TARGET GROUP NUMBER 2 | $t_2\_ang_1$ | $t_2\_ang_2$ |  | $f_2$ |
| TARGET GROUP NUMBER 3 | $t_3\_ang_1$ | $t_3\_ang_2$ |  | $f_3$ |
| TARGET GROUP NUMBER 4 | $t_4\_ang_1$ | $t_4\_ang_2$ |  | $f_4$ |
| ⋮ |  |  |  |  |

FIG. 27

| TARGET GROUP NUMBER | VERTICAL DISTANCE | VERTICAL POSITION | LATERAL POSITION | RELATIVE VELOCITY | FREQUENCY POINT |
|---|---|---|---|---|---|
| TARGET GROUP NUMBER 1 | $r_1$ | $long\_d_1$ | $late\_d_1$ | $v_1$ | $f_1$ |
| TARGET GROUP NUMBER 2 | $r_2$ | $long\_d_2$ | $late\_d_2$ | $v_2$ | $f_2$ |
| TARGET GROUP NUMBER 3 | $r_3$ | $long\_d_3$ | $late\_d_3$ | $v_3$ | $f_3$ |
| TARGET GROUP NUMBER 4 | $r_4$ | $long\_d_4$ | $late\_d_4$ | $v_4$ | $f_4$ |
| ⋮ | | | | | |

ELECTRONIC SCANNING RADAR APPARATUS, RECEIVING WAVE DIRECTION ESTIMATING METHOD, AND COMPUTER-READABLE STORAGE MEDIA STORING RECEIVING WAVE DIRECTION ESTIMATION PROGRAM

CROSS-REFERENCE TO RELATED APPLICATIONS

Priority is claimed on Japanese Patent Application No. 2010-115500, filed May 19, 2010, the content of which is incorporated herein by reference.

BACKGROUND OF THE INVENTION

1. Field of the Invention

The present invention relates to an electronic scanning radar apparatus preferably equipped in a moving body, a receiving wave direction estimating method, and a computer-readable storage media storing a receiving wave direction estimation program in which the electronic scanning radar apparatus transmits a transmission wave to a target so as to detect the target by receiving a reflection wave of the transmission wave reflected from the target.

2. Description of the Related Art

In general, an electronic scanning radar apparatus is known as an on-board radar. For the radar, a frequency modulated continuous wave (FMCW) radar, a multiple-frequency continuous wave radar, a pulse radar or the like is employed.

For each radar described above, a receiving wave direction estimating method with array antennas is used for detecting the direction of a receiving wave from a target. The receiving wave may be referred to as an incoming wave, and the target may be referred to as a reflecting object.

Recently, the receiving wave direction estimating method employs highly accurate algorithms such as an auto regressive spectral estimation method (AR spectral estimation method; see FIG. 33), a multiple signal classification method (MUSIC method) or the like, which can provide high resolution (high accuracy) of the direction of receiving waves without increasing channels of receiving antennas. These methods are described in Japanese Unexamined Patent Application, First Publication, Nos. 2006-275840, 2007-40806 and 2009-156582. These methods are also described in "MATLAB Multi-media Signal Processing part I: Digital signal fundamentals" published by Ikehara and Shimamura in 2004 by BAIFUKAN CO., LTD (hereafter referred to as nonpatent publication 1), and described in "Adaptive Signal Processing with Array Antennas" published by Kikuma in 1998 by Kagaku Shuppan Co. LTD (hereafter referred to as nonpatent publication 2).

As the AR spectral estimation method a maximum entropy method (MEM) or a linear prediction method can be used.

For estimating the direction of receiving waves from a target (reflecting object) with those algorithms, input data indicated by complex numbers are converted into a matrix form called as a correlation matrix, and then the estimation process is performed. The input data is formed by synthesizing a complex sine wave and a noise component.

Japanese Unexamined Patent Application, First Publication, Nos. 2007-40806 and 2009-156582 described a receiving wave direction estimation process of radar mounted in a car, in which the direction estimation correlation matrixes in past detecting cycles are stored in a memory, and then the correlation matrixes are averaged (or performed by an addition process) with a correlation matrix in the present detecting cycle in order to reduce noise components. This averaging process of the correlation matrixes can reduce noise factors (components), so that the accuracy of the receiving wave direction estimation is improved.

For the fewer the number of channels of the array antennas, a radar apparatus can be manufactured at less cost with smaller size, which is suitable for an on-vehicle radar apparatus. On the other hand, the accuracy of estimation becomes lower even if a highly accurate algorithm is used, when the amount of data sets (data) becomes insufficient for an accurate estimation. Namely, when the amount of data sets becomes insufficient, it becomes difficult to treat the receiving signals as ideal sine waves. This influences the results of correlation processes. For this problem, the averaging process is performed between the correlation matrixes, so that the accuracy of the detection of a target becomes greatly improved.

Japanese Unexamined Patent Application, First Publication, No. 2007-40806, describes that the correlation matrixes must be stored in the memory (or storage device) as information that corresponds to the whole distance (frequency) points. This requires a mass storage device (or large capacity memory) when the detection range is expanded or the detection accuracy is improved. The past correlation matrixes have beat frequencies that correspond to those of the present correlation matrix. This condition provides proper averages for detecting the direction of the target as long as the electronic scanning radar apparatus follows the target in a constant distance. However, when the distance between the electronic scanning radar apparatus and the target is varied, there is a possibility that the beat frequency of the present correlation matrix does not correspond to those of the past correlation matrixes. This could degrade the data used for detecting the direction of the target.

It is described in Japanese Unexamined Patent Application, First Publication, No. 2009-156582 that the storage capacity of a memory can be reduced, compared to the case of Japanese Unexamined Patent Application, First Publication, No. 2007-40806, by only storing distant points (frequency points) of targets in the memory, in which the targets have been determined. However, in order to improve the estimation accuracy, the amount of data (correlation matrixes) used in the averaging process needs to be increased for performing the averaging process. In order to increase the amount of data to be averaged, either the amount of storing of past data (correlation matrixes) stored or the amount of data to be used in an identical detection cycle needs to be increased. For example, if the amount of data to be used in the identical detection cycle is increased when using the FMCW millimeter wave radar, the number of triangular waves needs be increased. In such a case, a challenge will be to solve issues concerning an increase in the capacity of memories and an increase in computing load. For example, the increase in the computing load is caused by increases in the amount of FFT operation which processes along time axis data for every channels, the amount of operations of combination processes of DBF (Digital Beam Forming), and operations of peak detecting processes.

SUMMARY OF THE INVENTION

One of embodiments in accordance with the invention takes these conditions into consideration, and it is a primary object of an aspect of the invention to provide an electronic scanning radar apparatus, a receiving wave direction estimating method, and a computer-readable storage media storing a receiving wave direction estimation program.

In accordance with an aspect of the present invention, an electronic scanning radar apparatus is mounted on a moving body, and the electronic scanning radar apparatus includes a receiving unit configured to include a plurality of antennas receiving a receiving wave coming from a target which reflects a transmission wave having been transmitted, a beat signal generation unit configured to generate beat signals in response to the transmission wave and the receiving wave, a frequency resolution processing unit configured to resolve the beat signals into beat frequencies having a predetermined frequency band width, the frequency resolution processing unit calculating a complex number data based on the beat signals resolved for each of the beat frequencies, a target detecting unit configured to detect a peak value from intensity values of the beat frequencies so that the target detecting unit detects an existence of the target, a memory unit configured to store a data generation unit, the data generation unit being generated in a present detecting cycle that is performed in a present time and used in a next detecting cycle that is performed after the present detecting cycle, the present and next detecting cycles being repeatedly performed to calculate an incoming direction of the receiving wave, a target link unit configured to make association between a target detected in the present detecting cycle and the target detected in the past detecting cycle that is performed before the present detecting cycle and store the data generation unit associated with the target into the memory, and a direction estimating unit configured to generate a generative complex number data to correspond to the data generation unit, the generative complex number data being generated based on a complex number data calculated from the beat frequencies, the direction estimating unit calculating, for each antenna, an incoming direction of the receiving wave based on each normal equation formed by use of the generative complex number data, the generative complex number data being formed to correspond to the complex number data of a detected beat frequency that is the beat frequency which an existence of the target has been detected and the data generation unit, wherein the direction estimating unit performs an averaging process for at least part of elements that form the normal equation.

In accordance with another embodiment of the present invention, the electronic scanning radar apparatus may include a direction estimating unit, wherein, for the normal equation indicated by a linear form consisting of elements of a right hand side vector, an AR coefficient and a correlation matrix used in an autoregressive estimation process, based on the complex number data and based on either a first correlation matrix or a first element of a first normal equation determined by a first right hand side vector and the generative complex number data, for a second element of a second normal equation which determines a second correlation matrix and a second right hand side vector, the direction estimating unit calculates the AR coefficient based on a result of an averaging process performed for the second element corresponding to the first element.

In accordance with another embodiment of the present invention, the direction estimating unit includes a normal equation generation unit that generates the first normal equation and the second normal equation, an AR coefficient calculation unit that generates the AR coefficient based on the first normal equation and the second normal equation, a spectrum calculation unit that calculate the incoming direction of the receiving wave from a power spectrum led based on the AR coefficient, and a data generation unit that generates the generative complex number data led from the complex number data and the AR coefficient.

In accordance with another embodiment of the present invention, the direction estimating unit further includes a normal equation filter configured to calculate an averaged normal equation obtained by performing the averaging process for the first normal equation and the second normal equation, wherein the AR coefficient calculation unit leads the AR coefficient based on an averaged normal equation.

In accordance with another embodiment of the present invention, when a present correlation matrix and the right hand side vector become elements of a present normal equation generated in the present time, and a past correlation matrix and the right hand vector become elements of the normal equation generated in the present time based on past information, the normal equation generation unit generates an averaged correlation matrix and an averaged right hand side vector, being associated the target, the averaged correlation matrix is generated based on the averaging process with weighing performed for the present correlation matrix and the past correlation matrix, and the averaged right hand side vector is generated based on the averaging process with weighting performed for the present right hand side vector and the past right hand vector, and the AR coefficient calculation unit leads the AR coefficient from the normal equation having the averaged correlation matrix and the averaged right hand side vector as elements.

In accordance with another embodiment of the present invention, the AR coefficient calculation unit calculates an averaged AR coefficient by performing the averaging process for the first AR coefficient generated based on the generated first normal equation and the second AR coefficient generated based on the generated second normal equation.

In accordance with another embodiment of the present invention, the memory unit stores at least either the generative complex number data or part of elements of the generated normal equation as the data generation unit, the direction estimating unit stores at least either the generative complex number data or part of elements of the generated normal equation into the memory unit by use of the target link unit.

In accordance with another embodiment of the present invention, the data generation unit to be stored is the AR coefficient.

In accordance with another embodiment of the present invention, for the target being associated, the memory unit stores a past distance of the target and a past relative velocity detected in the past detecting cycle and the AR coefficient making association among them, the target link unit links between a target of the present detecting cycle and a past target of a past detecting cycle associated with the present detecting cycle and related to the present in time series, the AR coefficient calculation unit generates the averaged AR coefficient by performing the averaging process with weighting for the AR coefficient, and associates the distance of the target of the present detecting cycle, the relative velocity and at least one of the AR coefficient or the averaged AR coefficient with the distance of the past target of the past detecting cycle, the relative velocity and at least one of the AR coefficient or the averaged AR coefficient of the past detecting cycle, and then the AR coefficient calculation unit stores them into the memory.

In accordance with another embodiment of the present invention, the data generation unit that is stored into the memory is the generative complex number data.

In accordance with another embodiment of the present invention, when the target link unit makes association between the present target detected in the present detecting cycle and the past target detected in the past detecting cycle, the target link unit detects whether the present target of the present detecting cycle and the past target of the past detecting cycle are associated each other or not according to a result of whether or not a present distance and a present relative velocity obtained from the detected beat frequency of the present detecting cycle are respectively within a distance range and a relative velocity range calculated from a past distance and a past relative velocity obtained in the past detecting cycle.

In accordance with another embodiment of the present invention, the electronic scanning radar apparatus further includes a DBF unit configured to detect a direction and existence of the target based on a digital beam forming that improves a detecting sensitivity of a desired direction receiving the receiving wave based on the complex number data, wherein the target detecting unit detects the direction of the target based on the digital beam forming of the beat frequency in the present detecting cycle, and the target link unit makes association between the present target of the present detecting cycle and the past target of the past detecting cycle based on a distance, a relative velocity and a direction.

In accordance with another embodiment of the present invention, the DBF unit calculates a spatial complex number data indicating an intensity of a spectrum for each angle channel corresponding to a predetermined direction preset based on the digital forming beam, and the DBF unit further includes a channel deletion unit configured to detect an existence of a DBF target when spectrum intensities of adjacent angle channels of a predetermined angle channel range exceed a predetermined DBF threshold value, the channel deletion unit rewriting the spectrum intensities of the angle channels which the existence of the target is not detected with "0" and transmitting a resulting data as a new spatial complex number data; and an IDBF unit configured to generate a regenerated complex number data by performing an inverse digital beam forming for the new spatial complex number data, wherein the normal equation generation unit generates the normal equation from the regenerated complex number data.

In accordance with another embodiment of the present invention, the channel deletion unit divides, when having detected plural DBF targets, a spectrum into respective angle channels corresponding to each of the DBF targets and generates the spatial complex number data for a number of the DBF targets, the IDBF unit generates the regenerated complex number data for each of the DBF targets by performing the inverse digital beam forming for the spatial complex number data for each of the DBF targets, and the normal equation generation unit calculates the normal equation for each of the DBF targets based on the regenerated complex number data for each of the DBF targets.

In accordance with another aspect of the present invention, a receiving wave direction estimation by use of an electronic scanning radar apparatus that is mounted on a moving body, the direction estimation method includes transmitting a transmission wave from a transmission unit, receiving a receiving wave coming from a target by a receiving unit configured to include a plurality of antennas, the target reflecting the transmission wave that is transmitted from the transmission unit, generating beat signals from the transmission wave and the receiving wave by a beat signal generation unit, storing a data generation unit into a memory unit, the data generation unit being generated in a present detecting cycle that is performed in a present time and used in a next detecting cycle that is performed after the present detecting cycle, the present and next detecting cycles being repeatedly performed to calculate an incoming direction of the receiving wave, making association between a target detected in the present detecting cycle and the target detected in the past detecting cycle that is performed before the present detecting cycle and storing the data generation unit associated with the target into the memory, generating a generative complex number data to correspond to the data generation unit, the generative complex number data being generated based on a complex number data calculated from the beat frequencies, and calculating, for each antenna, an incoming direction of the receiving wave based on each normal equation formed by use of the generative complex number data, the generative complex number data being formed to correspond to the complex number data of a detected beat frequency that is the beat frequency which an existence of the target has been detected and the data generation unit, wherein calculating the incoming direction includes an averaging process that is performed for at least part of elements that form the normal equation.

In accordance with another aspect of the present invention, a computer-readable storage medium storing a receiving wave direction estimation program for causing a computer to control an electronic scanning radar apparatus, which is mounted on a moving body, the receiving wave direction estimation program includes transmitting a transmission wave from a transmission unit, receiving a receiving wave coming from a target by a receiving unit, the target reflecting the transmission wave, generating beat signals from the transmission wave and the receiving wave by a beat signal generation unit, resolving the beat signals into beat frequencies having a predetermined frequency band width and calculating a complex number data by a frequency resolution processing unit, detecting a peak value from intensity values of the beat frequencies so as to detect an existence of the target by a target detecting unit, storing a data generation unit into a memory unit, the data generation unit being generated in a present detecting cycle that is performed in a present time and used in a next detecting cycle that is performed after the present detecting cycle, the present and next detecting cycles being repeatedly performed to calculate an incoming direction of the receiving wave, making association between a target detected in the present detecting cycle and the target detected in the past detecting cycle that is performed before the present detecting cycle and storing the data generation unit associated with the target into the memory, generating a generative complex number data to correspond to the data generation unit, the generative complex number data being generated based on a complex number data calculated from the beat frequencies, and calculating, for each antenna, an incoming direction of the receiving wave based on each normal equation formed by use of the generative complex number data, the generative complex number data being formed to correspond to the complex number data of a detected beat frequency that is the beat frequency which an existence of the target has been detected and the data generation unit, wherein calculating the incoming direction includes an averaging process that is performed for at least part of elements that form the normal equation.

BRIEF DESCRIPTION OF THE DRAWINGS

FIG. 5 is an illustration of a matrix of beat frequencies in the ascent and the descent at a peak combination unit 24 of FIG. 1, i.e., showing distances and relative velocities between the target and an electronic scanning radar apparatus obtained by combining the beat frequencies in the ascent and the descent;

FIG. 6 illustrates a data table that shows distances and relative velocities for every target in the present detecting cycle;

FIG. 9 is a drawing that illustrates the data extension Burg method;

FIG. 14 is a drawing that illustrates a data table stored into a memory 21;

FIG. 17 is a drawing that illustrates a data table stored in a memory 21;

FIG. 24 is a data table which includes data such as distances, vertical positions, lateral positions, and relative velocities, which have been determined by combination process of data peaks obtained in the ascent and the descent regions;

FIG. 25A illustrates a data table which is included in a memory;

FIG. 25B illustrates a data table which is included in a memory;

FIG. 27 is a data table which stores a data result obtained after determining each peak pairs for ascent and descent region;

DETAILED DESCRIPTION OF THE INVENTION (AR Spectral Estimation)

In the following, a description will be given for an autoregressive spectral estimation method (AR spectral estimation method).

The AR spectral estimation method performs an estimation process using an autoregressive model (AR model). The non-patent publication 1 describes the AR spectral estimation method as a spectral estimation method that estimates a spectrum, being similar to a multiple signal classification method (MUSIC method). The AR spectral estimation method is categorized as a parametric method, while the MUSIC method is categorized as a subspace method. The AR spectral estimation method is also regarded as either a maximum entropy method or a linear prediction method. These methods can also be categorized as a parametric method.

Figure 33:
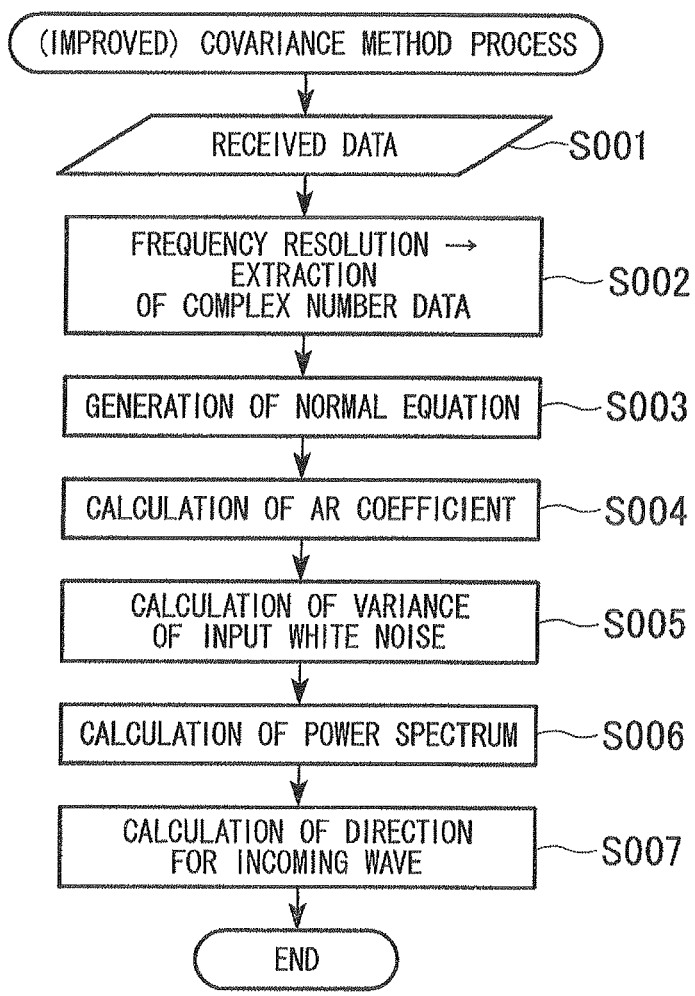
FIG. 33 is a drawing that illustrates an AR spectrum estimation processing according to a related art.

The AR spectral estimation method first models data using the AR model, which is described by a linear equation, and then forms a normal equation based on input data. The normal equation includes matrixes such as an auto-correlation matrix and a covariance matrix, and vectors such as a right hand side vector and a correlation vector. The AR spectral estimation method further obtains a coefficient of AR filter (AR coefficient) and a variance of white noise based on the normal equation, and then estimates a power spectrum by use of the AR coefficient and the variance of white noise. A process flow of AR spectral estimation method is shown in FIG. 33. The AR spectral estimation method may use input data such as time sequential data, or the channel data of spatial direction used in the present embodiment. The AR spectral estimation method is roughly classified into a method based on the auto-correlation matrix and another method based on the covariance matrix. The auto-correlation matrix includes an auto-correlation method (Yule-Walker method) and a Burg method. The covariance matrix also includes a covariance method and a modified covariance method. In any of the methods mentioned above, their algorithm generates a normal equation and obtains an AR coefficient. The preferred embodiments of the present invention can be applied to those methods.

First Embodiment

In the following, there will be described about an electronic scanning radar apparatus (FMCW millimeter wave radar) in accordance with preferred embodiments of the present invention with reference to figures.

Figure 1:
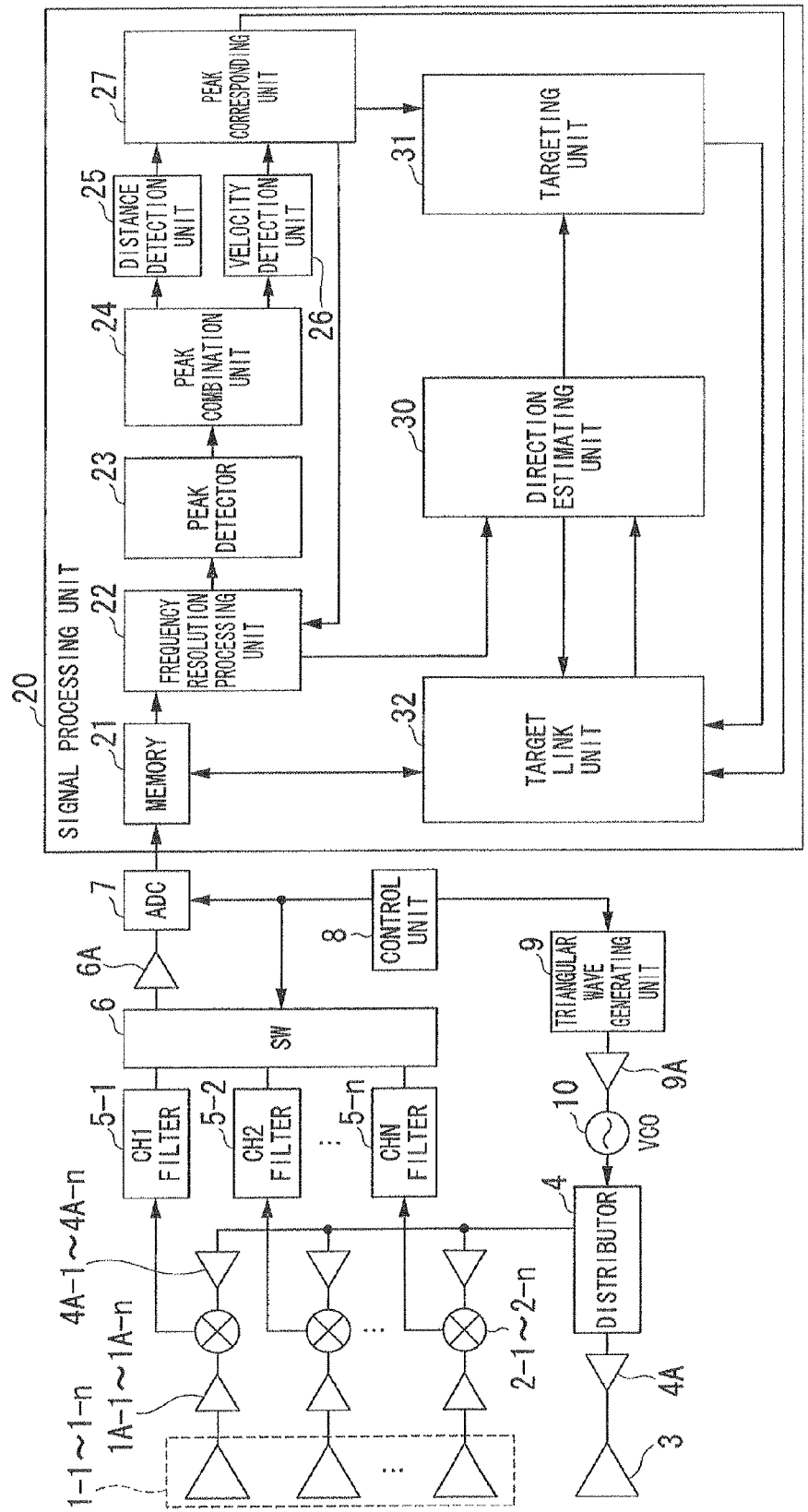
FIG. 1 is a block diagram of an electronic scanning radar apparatus in accordance with a first preferred embodiment of the present invention.

FIG. 1 is a block diagram of an electronic scanning radar apparatus 20 in accordance with a first preferred embodiment of the present invention.

In the figure, the electronic scanning radar apparatus includes receiving antennas 1-1 through 1-$n$, mixers 2-1 through 2-$n$, a transmission antenna 3, a distributor 4, channel filters 5-1 through 5-$n$, a switching unit SW 6, an A/D convertor ADC 7, a control unit 8, a triangular wave generating unit 9, a voltage control oscillator VCO 10, and a signal processing unit 20.

The signal processing unit 20 includes a memory (or memory unit) 21, a frequency divider 22, a peak detector 23, a peak combination unit 24, a distance detection unit 25, a velocity detection unit 26, a peak corresponding unit 27, a direction estimating unit 30, a targeting unit 31, and a target link 32 (target link unit 32). The target link may be referred to as the target link unit.

With reference to FIG. 1, the operations of the electronic scanning radar apparatus in accordance with the present embodiment is described below.

The receiving antennas 1-1 through 1-$n$ receive incoming waves which come from a target. After the transmission antennas 3 transmits a transmission wave toward the target, a reflection wave is formed at the target by reflection of the transmission wave, and the reflection wave is received by the receiving antennas 1-1 through 1-$n$ as receiving waves. The receiving waves may be referred to as incoming waves.

The receiving waves are respectively amplified through the amplifiers 1A-1 through 1A-$n$ after being received by the receiving antennas 1-1 through 1-$n$. The amplified receiving waves (signals) are mixed at the mixers 2-1 through 2-$n$ with the transmission wave (signal) after passing through the amplifiers 4A-1 through 4A-$n$. Then, each of the mixers 2-1 through 2-$n$ generates a beat signal in response to a frequency difference between each of the receiving waves and the transmission wave.

The beat signal is transmitted from the transmission antennas 3 to a corresponding one of channel filters 5-1 through 5-$n$.

The triangular wave generating unit 9 generates triangular wave signals. The triangular wave signals are modulated at the voltage control oscillator VCO 10 after passing through the amplifier 9A. The transmission antenna 3 transmits the triangular wave signals toward a target (or targets) as transmission waves.

The distributor 4 distributes the transmission signal modulated at the VCO 10 to the mixers 2-1 through 2-$n$ and the transmission antennas 3.

The channel filters 5-1 through 5-$n$ correspond to channels Ch-1 through Ch-n as indicated in FIG. 1. Thus the beat signal generated by each of the mixers 2-1 through 2-$n$ corresponds to one of the channels Ch-1 through Ch-n. The channels Ch-1 through Ch-n also correspond to the receiving antennas 1-1 through 1-$n$, respectively. Each of the channel filters 5-1 through 5-$n$ performs band limitation for a beat signal in a predetermined range, and transmits a band limited beat signal to the SW 6.

The control unit 8 transmits a sampling signal to the switching unit SW 6. The SW 6 sequentially transmits the beat signal to the ADC 7 in response to the sampling signal, in which the beat signal corresponds to one of the beat signals of Ch-1 through Ch-n. The beat signals of Ch-1 through Ch-n correspond to one of the receiving antennas 1-1 through 1-$n$, and are synchronized with the sampling signal.

The convertor ADC 7 converts the beat signals of Ch-1 through Ch-n into digital signals by A/D converting with synchronizing with the sampling signals. The convertor ADC 7 sequentially stores the converted digital data of the beat signals of Ch-1 through Ch-n into a waveform store area of the memory 21 in the signal processing unit 20.

The control unit 8 may be a micro computer or the like. The control 8 includes ROM (read only memory) or the like which stores a control program or the like. The electronic scanning radar apparatus shown in FIG. 1 is controlled based on the control program.

(Detection Method of Distance, Relative Velocity, and Angle (Direction))

With respect to figures, the present embodiment will be briefly described below regarding methods used to detect distances, relative velocities and angles (directions) between the electronic scanning radar apparatus and a target, in which the methods are used in the signal processing unit 20.

Figure 2A:
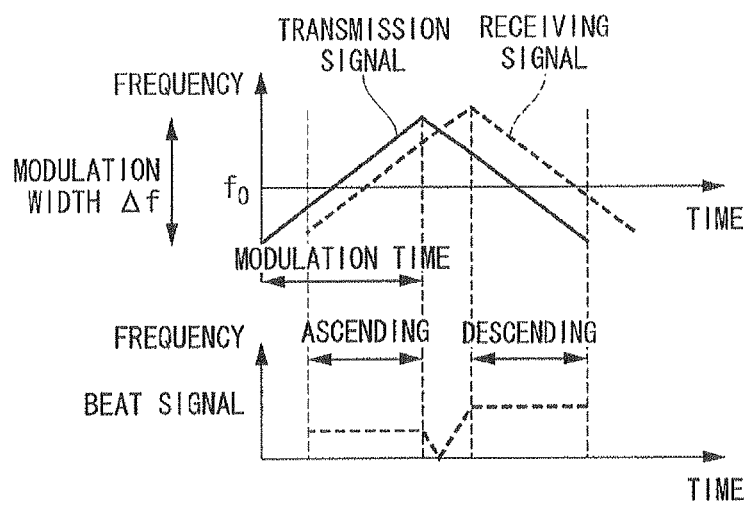
FIG. 2A is a drawing showing a transmission signal and a reflecting signal reflected from a target received by an electronic scanning radar apparatus.
Figure 2B:
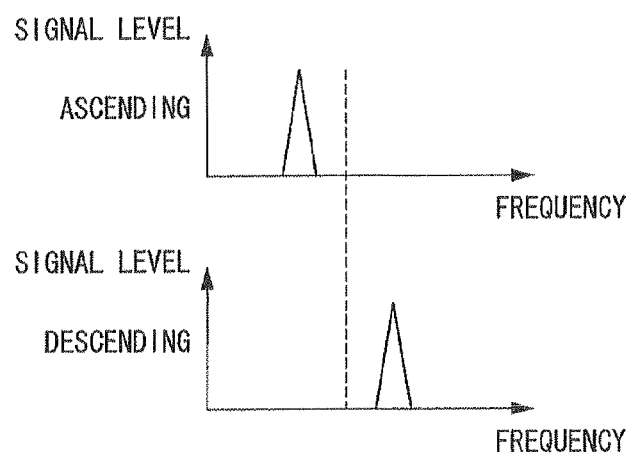
FIG. 2B is a drawing showing signals transformed from beat signals obtained in FIG. 2A by a frequency conversion.

FIG. 2A and FIG. 2B are drawings showing that a transmission signal and a reflecting signal reflected from a target received by the electronic scanning radar apparatus.

In the figures, the transmission signal is formed by modulating a signal generated at the triangular wave generating unit 9 of FIG. 1. The modulation is performed using the VCO 10. The transmission signal is reflected at the target, and the reflected signal is received by the receiving antennas 1-1 through 1-$n$ as receiving signals. In this case, it is assumed that there is a single target to be detected.

FIG. 2A shows that the receiving signal indicates a time delay compared to the transmission signal, in which the receiving signal is indicated on the right side (time-delay direction) of the transmission signal. The time-delay is proportional to the distance between the electronic scanning radar apparatus and the target. The frequency of the received signal is varied in the vertical axis (frequency direction), being proportional to a relative velocity of the target to the electronic scanning radar apparatus. Further, beat signals are obtained for an ascent and a descent of the transmission signal and the received signal, as indicated on down side of FIG. 2A. After a frequency transformation such as a Fourier transformation, a discrete cosine transform (DCT), a Hadamard transformation, a wavelet transformation or the like is made for the beat signals, two signal peaks are obtained in the ascent region and the descent region, respectively, as shown in FIG. 2B. In the figure, a vertical axis indicates signal levels (signal intensities), and a lateral direction indicates frequencies. Note that it is assumed that there is a single target being detected.

The data of the beat signals are sampled by synchronizing with the sampling signals. The frequency divider 22 performs frequency resolution for data of the beat signals stored in the memory 21. The frequency resolution may be performed by a Fourier transformation or the like to convert the data into frequencies for discrete time. The frequency resolution is performed for the data in the ascent and descent of the triangular wave. Namely, the frequency divider 22 performs frequency resolution for the beat signals to obtain beat frequencies having a predetermined frequency bandwidth. Then, the frequency divider 22 calculates complex number data based on the beat signals which are resolved as a function of the beat frequencies. The complex number data may be referred to as data of complex numbers.

As a result, the signal levels can be obtained for each of the beat frequencies at each of the ascent and the descent region as shown in FIG. 2B.

The peak detector 23 detects signal peaks of the signal levels for the beat frequencies as indicated in FIG. 2B, and detects whether the target exists or not. Further, the peak detector 23 transmits the beat frequencies of the signal peaks in the ascent and the descent to the peak combination unit 24 as target frequencies.

The distance detection unit 25 receives a target frequency fu at the ascent and a target frequency fd at the descent from the peak combination unit 24. After receiving the target frequency fu and the target frequency fd from the peak combination unit 24, the distance detection unit 25 calculates the distance to the target based on the following equation, $$r = \{C \cdot T/2 \cdot \Delta f\} \cdot \{(fu+fd)/2\}$$

where
C: speed of light
$\Delta f$: modulation frequency bandwidth of a triangular wave
T: modulation time for an ascent or a descent (See FIG. 2A)
fu: target frequency at the ascent region
fd: target frequency at the descent region.

After receiving the target frequency fu and the target frequency fd from the peak combination unit 24, the velocity detection unit 26 calculates the relative velocity v using the equation below, $$v = \{C/2 \cdot f0\} \cdot \{(fu-fd)/2\}$$

where
f0: center frequency of a triangular wave.

Hereafter, there the receiving antennas 1-1 through 1-$n$ are described.

Figure 3:
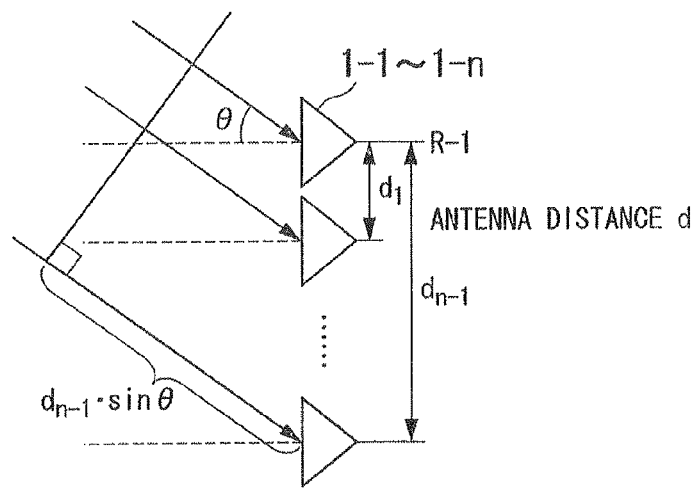
FIG. 3 is a view of array antennas showing how waves are received by the antennas.

FIG. 3 is a view of array antennas showing how waves are received by the antennas 1-1 through 1-$n$.

The receiving antennas 1-1 through 1-$n$ are provided with an arrayed structure having a antenna distance d as shown in FIG. 3. The receiving antennas 1-1 through 1-$n$ receive incoming waves from the target. The incoming waves may be referred to as receiving waves, and also the incoming waves are referred to as incident waves. The incoming waves are reflection waves, which are formed by the transmission waves from the transmission antenna 3 being reflected at the target. The reflection waves are received by the receiving antennas 1-1 through 1-$n$ at an angle $\theta$. The angle $\theta$ is the angle between an incident angle of the reflection waves and a direction normal to the surface of the arraigned antennas.

The incoming waves are received by the receiving antennas 1-1 through 1-$n$ at the same angle $\theta$.

A phase difference occurs between each of neighboring receiving antennas 1-1 through 1-$n$ for an angle $\theta$ and an antenna distance $d_1$. In this figure, the position of the antenna 1-1 is assigned as the reference position R-1 as an example. The phase difference is expressed by "$d_{n-1} \cdot \sin\theta$" for the given angle $\theta$ and the given distance d between neighboring antennas.

The phase difference can be used to detect the angle $\theta$ by signal processing. The signal processing is carried out using such a digital beam forming (DBF) method, a high resolution algorithm or the like. Data for the signal processing are obtained by performing the frequency resolution for each of the signals of the receiving antennas 1-1 through 1-$n$ in the time direction. The DBF method applies Fourier transformation to the obtained data for each direction of the antennas.

(Operation of Processing Unit 20 for Receiving Wave)

The memory 21 stores signal data in the wave storing area of the memory. The signal data are obtained with the receiving antennas 1-1 through 1-$n$ by the ADC7. The data are formed with the receiving signals that are converted by A/D conversion in time order (in the ascent and descent). For example, when the data sampling is performed to collect 256 data sets in the ascent and the descent respectively, the data sets to be collected will become a number of 2×256×n in total, where n indicates the number of the antennas 1-1 through 1-$n$. Then, the total number of the data sets is stored in the waveform store area of the memory 21.

The frequency divider 22 converts individual beat signals of the antennas 1-1 through 1-$n$ into frequency components by signal conversion based on. Fourier transformation or the like with a predetermined resolution. Then the frequency divider 22 outputs the frequency points of the beat frequencies and the complex number data of the beat frequencies. The frequency divider 22 generates the frequency points with those complex number data for respective frequency points. The beat signals individually correspond to channels Ch-1 through Ch-n of the antennas 1-1 through 1-$n$. Fourier transformation or the like may be used for the signal conversion. For example, when 256 data sets are stored in the memory 21 by performing the data sampling in the ascent and descent for each antenna, the 256 data sets consist of 128 complex number data in the ascent and 128 complex number data in the descent. In this case, the sampled data are converted into beat frequencies indicated as the complex number data of frequency data. The amount of the data sets for the whole antennas in total becomes "2×128×N (N: number of the antennas)." Further, the beat frequencies are expressed by the frequency points.

In this case, the complex number data of each antenna include a phase difference according to the angle $\theta$. Each of the complex number data indicates an equivalent absolute value in Gaussian plane, in which the equivalent absolute value corresponds to receiving signal intensity or amplitude.

The individual intensities (or amplitudes or the like) correspond to data sets of the ascent and the descent of the triangular waves. A data set is expressed by the complex number data, so that signal intensity is obtained from the complex number data of the data set. The complex number data are calculated based on the frequency conversion of the beat signals of the triangular waves. The peak detector 23 detects the beat frequencies having peak values greater than a predetermined value. Thereby, the peak detector 23 selects the target frequency by detecting the existence of the target for respective beat frequencies. The peak values may be referred to as peak signal levels.

Therefore, the peak detector 23 forms a frequency spectrum from the complex number data of any of the antennas or forms the frequency spectrum from the whole addition of the complex number data of the whole antennas. Thereby, the peak detector 23 can detect the existence of targets based on the individual peak values of the spectrum. In other words, the peak values are regarded as the existence of the targets as a function of distance, since the distance is obtained from the beat frequencies. Further, adding the total complex number data for the whole antennas enables to average noise components, so that the S/N ratio can be improved.

Figure 4A:
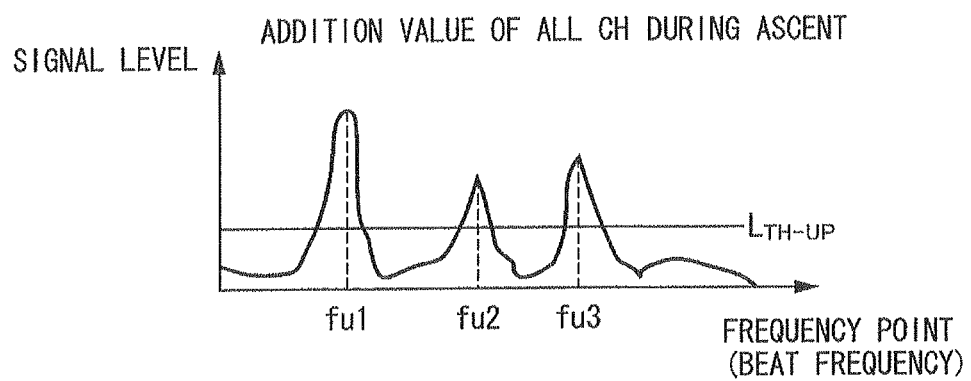
FIG. 4A is a frequency analysis result showing relationships between the signal levels (vertical axis) of beat signals and the beat frequencies (horizontal axis) for an ascent region.
Figure 4B:
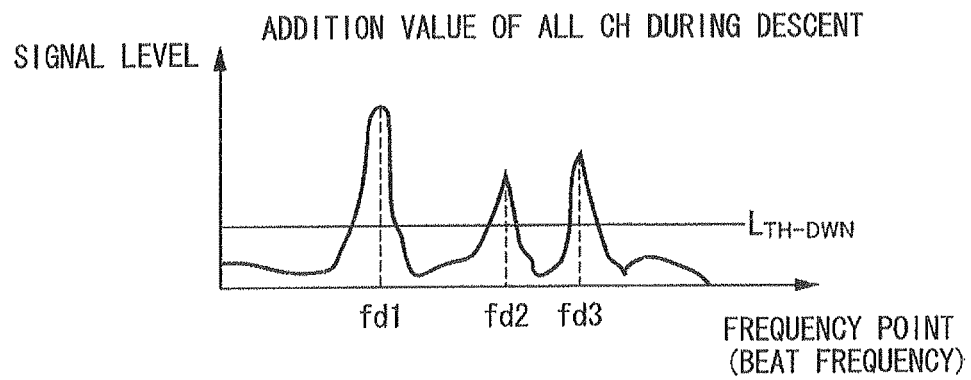
FIG. 4B is a frequency analysis result showing relationships between the signal levels (vertical axis) of beat signals and the beat frequencies (horizontal axis) for a decent region.

The beat frequencies (frequency points) and their peak values are indicated in FIG. 4A and FIG. 4B. The peak combination unit 24 receives the beat frequencies and their peak values from the peak detector 23. The peak combination unit 24 combines the beat frequencies and their peak values at the ascent and the descent in the manner of a matrix. The matrix is formed to make a round robin combination with respect to the beat frequencies and their peak values received from the peak detector 23. Namely, the peak combination unit 24 combines all the individual beat frequencies at the ascent and the descent region, and sequentially transmitted the combination result to the distance detection unit 25 and the velocity detection unit 26. FIG. 4A and FIG. 4B are frequency analysis results showing relationships between the signal levels (vertical axis) of beat signals and the beat frequencies (horizontal axis) in the ascent and the descent, respectively.

The distance detection unit 25 sequentially receives the beat frequencies in the ascent and the descent from the peak combination unit 24. Numerical values are obtained by adding each of the beat frequencies in the ascent and the descent. The distance detection unit 25 calculates the distance to a target from the numerical values.

Further, the velocity detection unit 26 calculates a relative velocity between the target and the electronic scanning radar apparatus. The relative velocity is obtained from a frequency difference between the beat frequencies in the ascent and descent, which are sequentially received from the peak combination unit 24.

The peak corresponding unit 27 forms a table consisting of the distance r, the relative velocity v, the peak levels pu, pd in the ascent and descent, as shown in FIG. 5. The peaks in the ascent correspond to a row direction (lateral direction), and the peaks in the descent correspond to a column direction (vertical direction). After performing the DBF method, the data table (matrix) is generated for a number of channels. The peak corresponding unit 27 determines appropriate data pair of the peaks in the ascent and descent of each target. The peak corresponding unit 27 determines the pair of peaks in the ascent and descent, and generates a data table as shown in FIG. 6. Further, the peak corresponding unit 27 determines and arranges the distances, the relative velocities by sorting grouped target numbers. Then the peak corresponding unit 27 transmits the grouped target numbers to a targeting unit 31. FIG. 6 illustrates a data table that stores distances and relative velocities and frequency points of the ascent and the descent according to the target group numbers. The tables shown in FIG. 5 and FIG. 6 are stored in an internal memory part of the peak corresponding unit 27. In this case, since the direction has not been determined for each target group, a position in a lateral direction parallel to the arranged direction of the receiving antennas 1-1 through 1-*n* is not determined for a perpendicular axis that is perpendicular to the arranged direction of the antenna array of the electric scanning radar apparatus.

For example, the pair setting 27 may use a method that selects combinations of the target groups by taking priority over a value predicted in the present detecting cycle based on the distance r from each target and the relative velocity v finally determined in the previous detecting cycle.

Further, the target link unit 32 connects the distance r, the relative velocity v and the frequency point indicated in FIG. 6 received from the peak corresponding unit 27 with the target having been determined in the past detecting cycle stored in the memory 21, and then the target link unit 32 transmits generation data or a coefficient obtained by the generation method recorded in the past detecting cycles for each target to the detection estimating unit 30.

The target link unit 32 attaches identification information such as the distance, the relative velocity and direction received from the targeting unit 31 to the generation data obtained based on the present complex number data or a coefficient, and stores them into the memory 21.

The detection estimating unit 30 estimates a present spectral estimation process by using a high resolution algorithm such as the AR spectral estimation process or the MUSIC method. The detection estimating unit 30 estimates a direction of the target based on a result of the averaging process performed with a past result of the spectral estimation and the result of the present spectral estimation process. The detection estimating unit 30 transmits the estimation result to the targeting unit 31.

Figure 7:
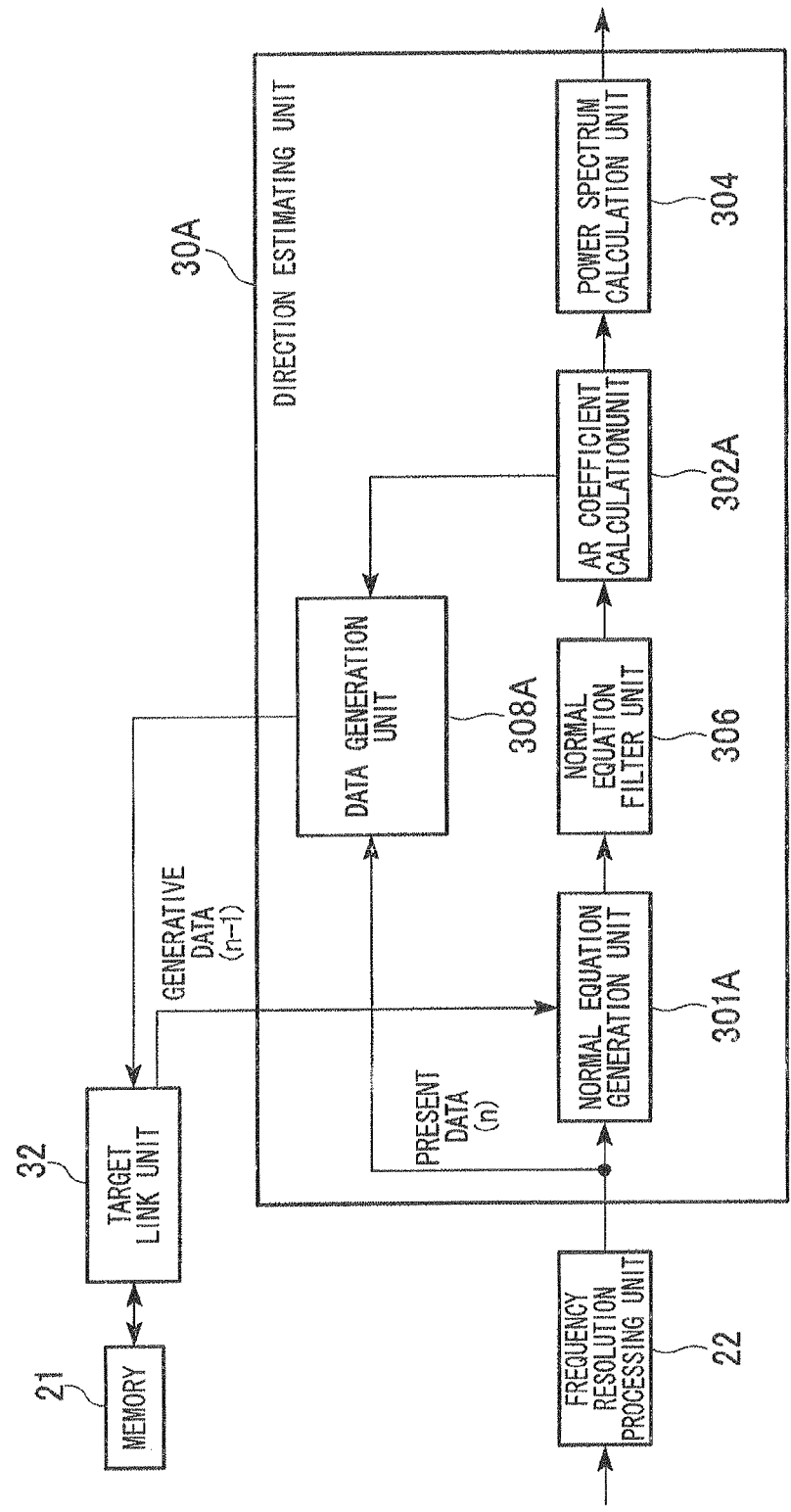
FIG. 7 is a block diagram that illustrates a signal processing unit of an electronic scanning radar apparatus in accordance with a preferred embodiment of the present invention.

FIG. 7 is a block diagram that illustrates a configuration of a direction estimating unit of an electronic scanning radar apparatus in accordance with a preferred embodiment of the present invention.

A direction estimating unit 30A of FIG. 7 corresponds to the direction estimating unit 30 of FIG. 1. The AR spectral estimation process is known as an accurate algorithm for a spectrum estimation process. The AR spectral estimation process will be described below more specifically as an example of configuration for a case where the AR spectral estimation method is performed. The direction estimating unit 30A includes a normal equation generation unit 301A, an AR coefficient calculation unit 302A, a power spectrum calculation unit 304, a normal equation filter unit 306, and a data generation unit 308A.

In the direction estimating unit 30A, the normal equation generation unit 301A generates normal equations required to perform the AR spectrum estimation process. The normal equation generation unit 301A generates normal equations from complex number data in response to beat frequencies which the frequency resolution processing unit 22, where the beat frequencies are either in the ascent or descent direction, or for both directions.

Further, the normal equation generation unit 301A generates a normal equation (generative normal equation: a second normal equation) deduced from the complex number data (generative complex number data) generated by the data generation unit 308A in the past detection cycle. Data generated by the data generation unit 308A are stored into the memory 21 via the target link unit 32. The normal equation generation unit 301A refers to the data via the target link unit 32.

The normal equation filter unit 306 performs an averaging process for a present normal equation generated by the normal equation generation unit 301A and a generative normal equation (a second normal equation).

The AR coefficient calculation unit 302A calculates an AR coefficient and a variance $\sigma_v^2$ of white noise, in which the AR coefficient is obtained based on the normal equation which is performed by the averaging process using the normal equation filter 306. Thus, the AR coefficient calculation unit 302A can perform a spectrum estimation based on the complex number data of the detected beat frequencies, which are the beat frequencies of which a target is detected, for each antenna according to detecting cycles. The power spectrum calculation unit 304 calculates the receiving wave direction of a receiving wave from the power spectrum obtained based on the AR coefficient and the variance $\sigma_v^2$ of white noise.

The date generation unit 308A generates, in the present detecting cycle, generative complex number data (second complex number data) to be used in the next detecting cycle, based on the detected complex number data and the AR coefficient obtained by the AR coefficient calculation unit 302A. The data generation unit 308A stores the generative complex number data into the memory 21 with the target link unit 32.

(Procedure of Receiving Direction Estimation Process of Receiving Wave)

A procedure for estimating direction of a receiving wave by the direction detection unit 30 will be described below about an example of the AR spectrum estimation method based on the improved covariance method as a high accuracy algorithm.

General descriptions of the AR spectrum estimation process are made in the nonpatent reference 1. Thus, only some parts of the AR spectrum estimation process, which are necessary for explaining the present embodiment, will be described hereafter.

Figure 8:
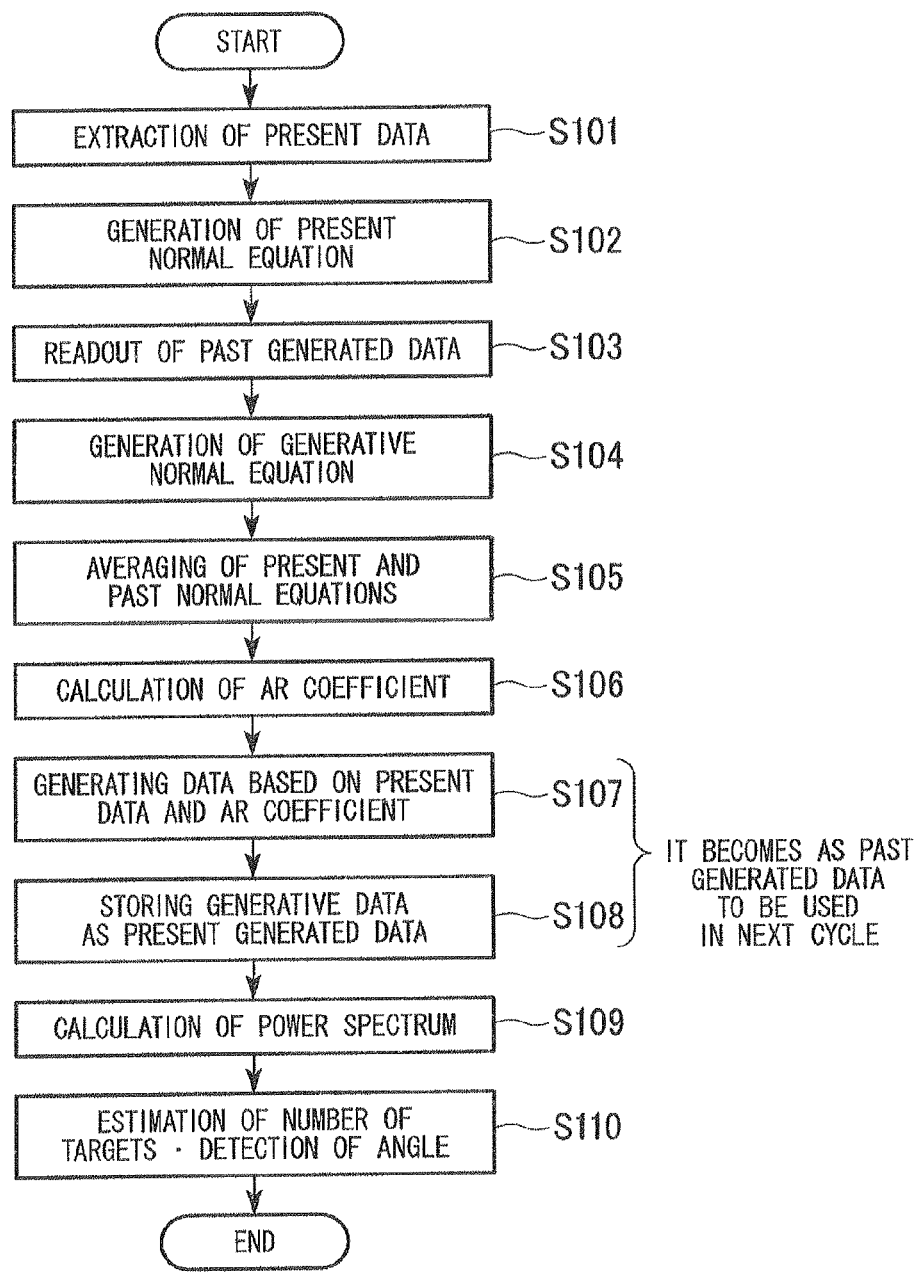
FIG. 8 is a flowchart illustrating data processing of the target direction estimation process of an electronic scanning radar apparatus.

FIG. 8 is a flowchart illustrating data processing of the target direction estimation process of an electronic scanning radar apparatus. The processes performed according to the flowchart of FIG. 8 are periodically repeated. For repeatedly performed processes, a process is referred to as the present cycle when the process is performed in the latest process cycle. A process is referred to as the past cycle when the process has been performed prior to the present cycle.

When data is taken twice in every control cycle, the process step up to step S108 is repeated twice between the start and the end of the flowchart in an identical control cycle. After the steps, a power spectrum is calculated.

For generating data in the present embodiment, it is important to use AR coefficient with an accurate value, in which the accurate AR coefficient is obtained by reducing the noise component based on the preliminary averaging process. To calculate a high accurate AR coefficient, either averaging between a covariance matrix and a right hand side vector or averaging of the AR coefficients may be performed.

In the following, an embodiment will be described as a process of averaging a covariance matrix of a normal equation and a right hand side vector.

In step S101, the frequency resolution processing unit 22 extracts the present complex number data (the present data) which the frequency resolution has been performed, where the present complex number data corresponds to a distant point of a reflecting object (a target).

In step S102, the normal equation generation unit 301A of the direction estimating unit 30 generates a covariance matrix and a right hand side vector based on the present complex number data, and sets them as the elements of a present normal equation (a present equation). The normal equation generation unit 301A forms the present normal equation (present equation) based on the obtained elements of the present normal equation.

In step S103, the target link unit 32 provides the normal equation generation unit 301A with a past generative complex number data (a past generative data) stored in the memory 21 by referring to the memory 21.

In step S104, the normal equation generation unit 301A of the direction estimating unit 30 generates a covariance matrix and a right hand side vector based on the generative complex number data (the past generative data) generated in the past processing cycle, and sets them as the elements of the past normal equation (the past equation).

In step S105, the normal equation filter unit 306 performs an averaging process for the generative present normal equation and the past normal equation (generative normal equation).

In step S106, the AR coefficient calculation unit 302A obtains an AR coefficient by solving the averaged normal equation. As a method for solving the equation, for example, a high speed algorithm such as Cholesky decomposition, which solves an inverse matrix, can be used. Further, the AR coefficient calculation unit 302A also obtains the variance $\sigma_v^2$ of input white noise.

Further, in step S107, the data generation unit 308A generates data based on the present data and the AR coefficient that is obtained by solving the averaged normal equation.

In step S108, the data generation unit 308A stores the generative data (generation data) into the memory 21 as the present generation data.

Succeedingly, in step S109, the power spectrum calculation unit 304 calculates a power spectrum. The power spectrum is obtained based on the AR coefficient with improved accuracy and the variance $\sigma_v^2$ of input white noise, where the accuracy of the AR coefficient has been improved based on the present data and the past generative data.

In step S110, the power spectrum calculation unit 304 determines a peak of the spectrum as a target. The power spectrum calculation unit 304 determines that the number of peaks of the spectrum correspond to the number of targets. The power spectrum calculation unit 304 further determines the receiving angles of receiving waves based on the angles corresponding to the peaks of the spectrum.

As described in the process procedure above, in early step, S103, the past generation data is read out. In step S105, the averaging process is performed for each of the elements of normal equation including the present data. In step S106, an accurate AR coefficient is calculated. In a later step, S107, the present data and the AR data use other data, and in step S108, the data is stored as the data to be used in the next cycle.

In this case, an averaging process for the covariance matrix and the right hand side vector may be performed and an AR coefficient may be obtained each time. Also, it is possible to perform the averaging process for the variance $\sigma_v^2$ of input white noise.

In the process described above, the AR coefficient relates to the characteristics of a power spectrum to be obtained, and contributes to the accuracy of detecting peak shapes of a power spectrum. Thereby, improving the accuracy of estimation of AR coefficient relates to improvement of estimation performance (angle estimating performance and angle separation performance).

(Processing of Generating Complex Number Data)

With reference to figures, an abstract concept of a complex number data generating process will be described below.

The abstract of "DATA PREDICTION for Burg method" is explained with reference to FIG. 9, based on nonpatent publication 3: "DATA PREDICTION for Burg method," T. Shimamura and S. Suzuki, IEICE (Institute of Electronics, Information and Communication Engineers) Trans. Fundamentals of Electronics, Communications and Computer Sciences J77-A, No. 8, pp. 1182-1185.

FIG. 9 is a drawing that illustrates the "data extension Burg method."

In this case, an extended data "x hat (n) (expressed by x)" is generated based on seven of original data "x(n)," where n is equal to or less than a natural number of N.

According to the "data extension method," the extended data "x hat (n)" is succeedingly generated after the original data "x(n)," regarding the original data "x(n)" as a starting point.

A relational expression for obtaining the extended data "x hat (n)" is written in equation (1) based on the data extension method as follows.

$$\hat{x}(n) = -\sum_{i=1}^{M'} \hat{a}(i)x(n-i), \quad (1)$$

$$n = N+1, N+2, \ldots, L$$

The data extension Burg method, which uses the Burg method in the AR spectrum estimation method, obtains an AR coefficient first based on an input data (a real number data is used in nonpatent publication 3), and then the amount of data (data length) is extended by estimating the outer of the input data based on a linear prediction equation (linear prediction processing) by use of the AR coefficient and the base input data. In calculating an AR coefficient in the second time after the data extension is performed, the accuracy of the normal equation can be improved and the order of the extended data can be replaced with that of the first extended data, because the amount of data being extended has been gained.

Further, a description will be given for a data extension method that is applied to the present embodiment with reference to FIG. 10.

Figure 10:
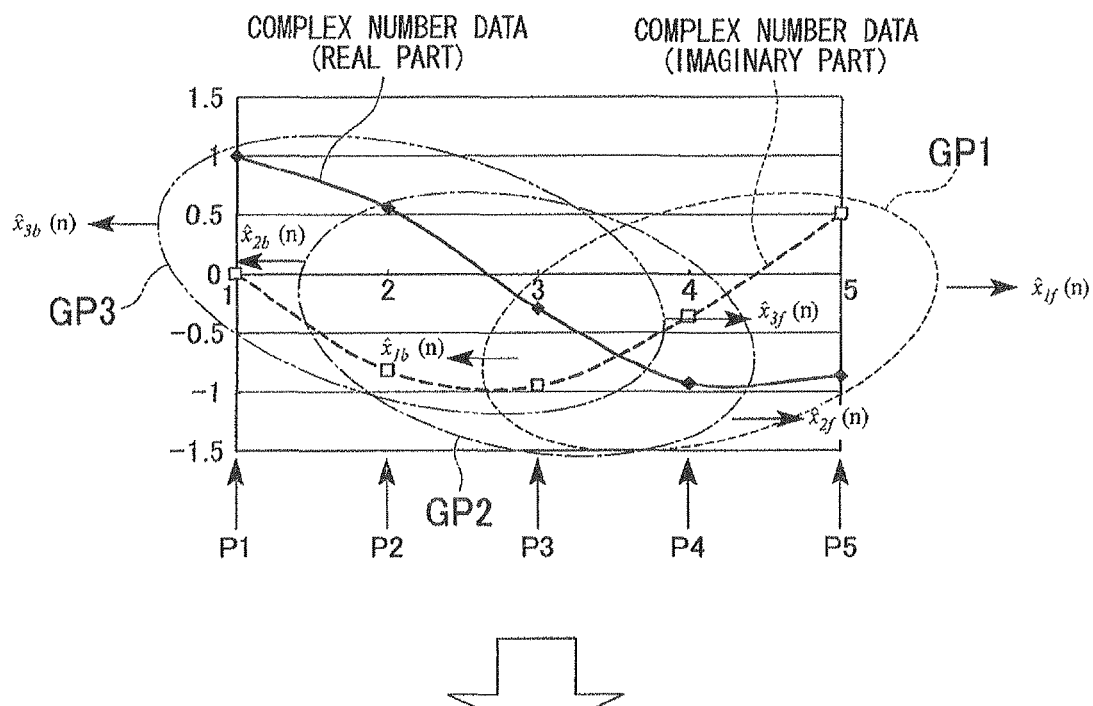
FIG. 10 is a drawing that illustrates a data extension method applied to the present embodiment.

FIG. 10 is a drawing that illustrates the data extension method to be applied to the present embodiment, in which the amount of data is set to be 5 and the order is set to be 3 as an example.

P1 through P5 are the points of the original data indicated by five complex number data. These data are classified into a series of three groups. The classified groups correspond to three groups, that is, GP1 through GP3. Thus, if there are a series of data having order, the data can be extended, and the maximum number of groups are determined by the amount of data and the order.

Based on three data included in each group, the linear prediction operation process is performed for each group so that the prediction operation process is preformed for the outer ranges of respective groups. Namely, the prediction operation process in the outer range is an operation process that performs extrapolation based on the original data.

For example, the linear prediction operation process is applied to the original data P2, P4 and P5 included in the group GP1, and thus a data of "$x_{lf}$ hat (n)" is obtained in the right hand side direction (a forward direction to the paper) and a data of "$x_{lb}$ hat (n)" is obtained in the left hand side direction (a backward direction to the paper). Similarly for groups GP2 and GP3, each of the forward direction data and the backward direction data is extended by the linear prediction operation process.

The data obtained by the data extension forms a normal equation, and a covariance matrix and a right hand side vector use the obtained data as their elements.

As illustrated in FIG. 9, the data extension Burg method extends data only based on data corresponding to the order of given data. On the other hand, as shown in FIG. 10, the data extension method in accordance with the present embodiment can use the whole data. Thus, the data extension of the present data extension method is not only extending data, but also generating many data with appropriate dispersion. As the present data extension method generates data from part of each point of the given data, the generative data become as if they are equivalent to data including dispersion, gaining the amount of data that can be used in an averaging process of the following normal equation filter. Because of a study of computer calculation experiments, it is found that the data extension method of the present embodiment can provide stable estimation accuracy for other methods in addition to the Burg method described in nonpatent publication 3. Accordingly, in the present embodiment, the data extension method of the present embodiment uses the improved covariance method in AR spectrum estimation.

Furthermore, it describes a process that generates complex number data in detail, with reference to figures.

Figure 11A:
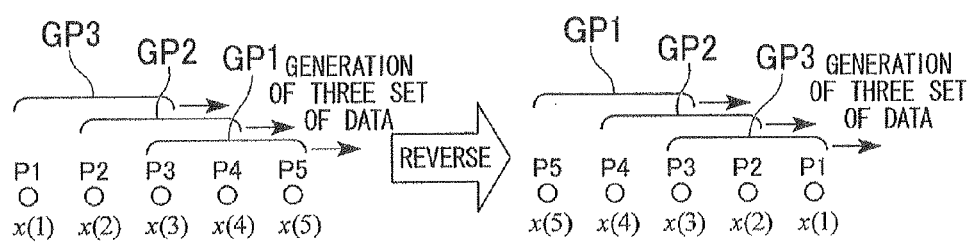
FIG. 11A is a drawing that illustrates a process for generating complex number data based on the forward linear prediction method.
Figure 11B:
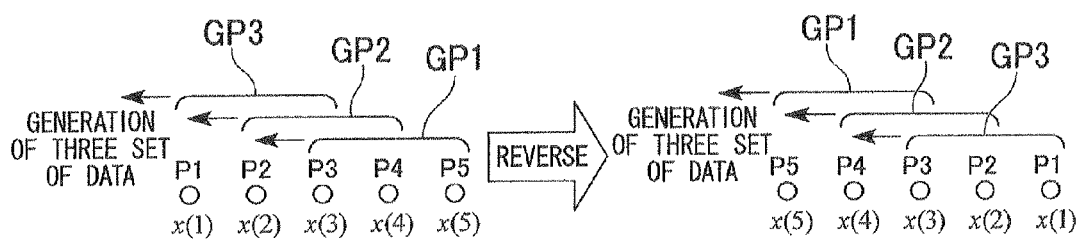
FIG. 11B is a drawing that illustrates a process for generating complex number data based on the backward linear prediction method.
Figure 11C:
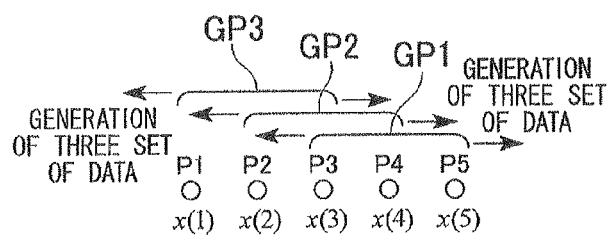
FIG. 11C is a drawing that illustrates a process for generating complex number data based on the forward and backward linear prediction methods.

FIGS. 11A through 11C are drawings that illustrate processes generating complex number data.

Now, FIG. 11A illustrates a process that generates complex number data by use of the forward direction linear prediction equation.

P01 through P05 are original data that are respectively indicated as (x(1), x(2), x(3), x(4), and x(5)).

When grouping is made for extracting a series of three data from the original data, three groups are classified into GP1 (x(1), x(2), x(3)), GP2 (x(2), x(3), x(4)), GP3 (x(3), x(4), x(5)) in turn.

In this case, the process direction is defined as a forward direction when the linear prediction is performed from the data x(1) toward x(5), while the process direction is defined as a backward direction when the linear prediction is performed from the data x(5) toward x(1).

An equation of performing a forward direction linear prediction is written in equation (2) as follows.

$$\hat{x}(n) = -\sum_{i=1}^{M} \hat{a}(i)x(n-i) \quad (2)$$

In equation (2), "x hat (n)" indicates data (generative data) to be generated, "a hat (n)" indicates an AR coefficient, and x(n−1) indicates an original data. M indicates the order of the equation.

The original data of the groups indicated above can be applied to equation (2), so that three sets of prediction data in the forward direction can be obtained.

Further, when an order of data in each group is set in reverse, and the reversed data are applied to the operation equation that performs the forward direction linear prediction process as indicated in equation (2), then the prediction data in the backward direction can be obtained.

Next, with reference to FIG. 11B, it describes a process which generates complex number data by use of the backward direction linear prediction equation.

Using the same original data, an operation equation for performing the backward linear prediction process is written in equation (3).

$$\hat{x}(n) = -\sum_{i=1}^{M} \hat{a}^*(i)x(n+i) \quad (3)$$

In equation (3), "x hat (n)" indicates data (generative data) to be generated, "a* hat (i)" indicates an AR coefficient, and x(n+i) indicates an original data. M indicates the order of the equation.

The original data of the groups indicated above can be applied to equation (3), so that three sets of prediction data in the backward direction can be obtained.

Further, when an order of data in each group is set in reverse, and the reversed data are applied to the operation equation that performs the backward direction linear prediction process as indicated in equation (3), then the prediction data in the forward direction can be obtained.

Next, with reference to FIG. 11C, it describes a process which generates complex number data by use of the forward direction and backward direction linear prediction equations.

By use of two operation equations, both the forward prediction operation process and the backward prediction operation process can be performed without reversing the order of the original data.

Any of three prediction operation processed described above can be applied, so that the forward and backward direction prediction operation processes can be performed. When the third order operation is performed for five channel data, then six set results of the prediction operation can be generated respectively.

Further, with reference to figures, a description will be given for a process that generates complex number data separately indicated by a real part and an imaginary part.

Figure 12:
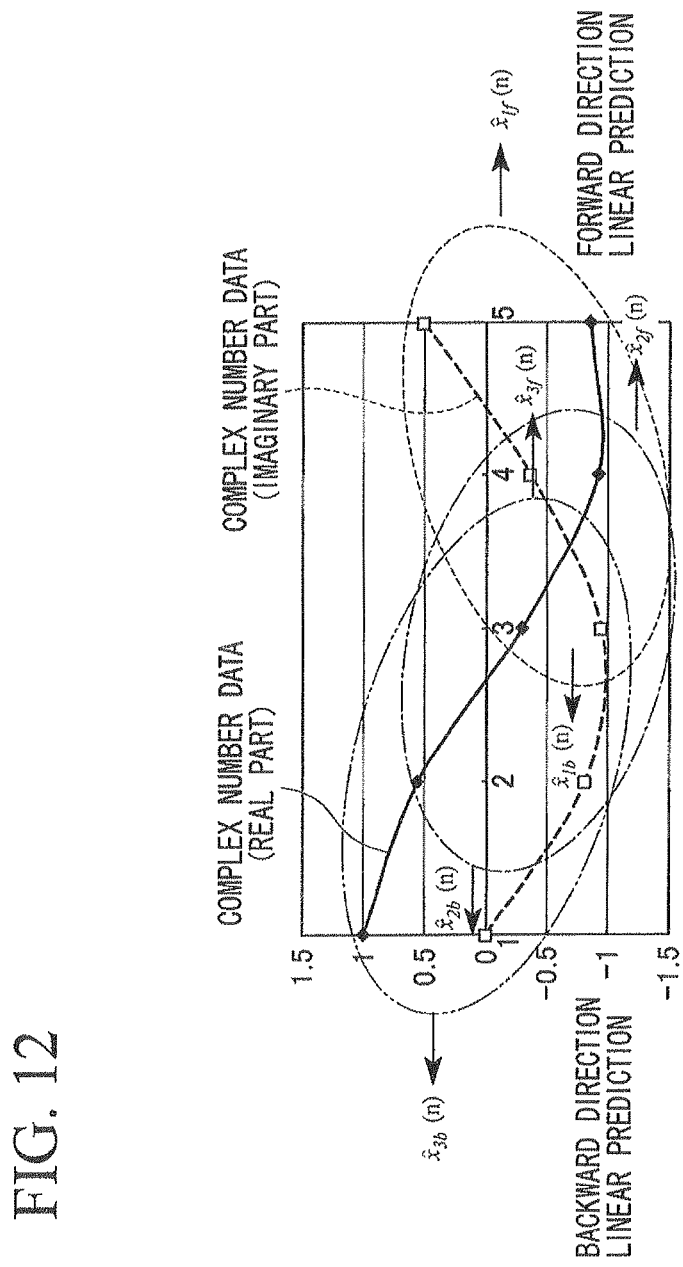
FIG. 12 is a drawing that illustrates generation of complex number data.

FIG. 12 is a drawing that illustrates generation of complex number data.

The complex number data is indicated respectively by the real part and the imaginary part, which are drawn as two curves.

A solid line indicates the variation of the real part and a broken line indicates the variation of the imaginary part.

The solid line indicates the variation of the real part, and the broken line indicates the imaginary part. Similar to the case of FIG. 11, when the third-order of processing is performed based on data of five channels, three sets of three serial data are formed for the real part and the imaginary part, respectively. Each set of the complex number data (real part and imaginary part) is substituted into complex numbers x(n−1) of the forward direction liner prediction equation and x(n+1) of the backward direction liner prediction equation, which are respectively expressed in equations (2) and (3).

(Procedure of Generating Normal Equation Based on AR Model)

Further, a procedure of generating normal equations based on AR model is described below in more detail.

A normal equation using a covariance matrix is written in equation (4).

$$C_M A = -vc, \quad C_M = \begin{bmatrix} C_x(1,1) & C_x(1,2) & \cdots & C_x(1,M) \\ C_x(2,1) & C_x(2,2) & \cdots & C_x(2,M) \\ \vdots & \vdots & \ddots & \vdots \\ C_x(M,1) & C_x(M,2) & \cdots & C_x(M,M) \end{bmatrix}, \quad (4)$$

$$A = \begin{bmatrix} \hat{a}_M(1) \\ \hat{a}_M(2) \\ \vdots \\ \hat{a}_M(M) \end{bmatrix}, \quad vc = \begin{bmatrix} C_x(1,0) \\ C_x(2,0) \\ \vdots \\ C_x(M,0) \end{bmatrix}$$

In equation (4), the left side corresponds to a product of a covariance matrix $C_M$ and an AR coefficient vector A.

The elements of the covariance matrix $C_M$ are obtained by a relational equation as indicated in equation (5).

$$c_x(j,k) = \frac{1}{2(N-M)} \left\{ \sum_{n=M}^{N-1} x^*(n-j)x(n-k) + \sum_{n=0}^{N-1-M} x(n+j)x^*(n+k) \right\} \quad (5)$$

$$k, j = 0, 1, \ldots, M$$

In the following, as a specific example, a description will be given for a processing of the third order (M=3) based on the data of five channels.

The covariance matrix $C_M$ can be expressed by a 3 columns and 3 rows (3×3) matrix, which is written in equation (3).

$$\begin{bmatrix} \hat{C}_{x3}(1,1) & \hat{C}_{x3}(1,2) & \hat{C}_{x3}(1,3) \\ \hat{C}_{x3}(2,1) & \hat{C}_{x3}(2,2) & \hat{C}_{x3}(2,3) \\ \hat{C}_{x3}(3,1) & \hat{C}_{x3}(3,2) & \hat{C}_{x3}(3,3) \end{bmatrix} \quad (6)$$

$$\hat{C}_{x3}(1,1) = (x^*(2)x(2) + x^*(3)x(3) + x(1)x^*(1) + x(2)x^*(2))/4$$

$$\hat{C}_{x3}(1,2) = (x^*(2)x(1) + x^*(3)x(2) + x(1)x^*(2) + x(2)x^*(3))/4$$

$$\hat{C}_{x3}(1,3) = (x^*(2)x(0) + x^*(3)x(1) + x(1)x^*(3) + x(2)x^*(4))/4$$

$$\hat{C}_{x3}(2,1) = (x^*(1)x(2) + x^*(2)x(3) + x(2)x^*(1) + x(3)x^*(2))/4$$

$$\hat{C}_{x3}(2,2) = (x^*(1)x(1) + x^*(2)x(2) + x(2)x^*(2) + x(3)x^*(3))/4$$

$$\hat{C}_{x3}(2,3) = (x^*(1)x(0) + x^*(2)x(1) + x(2)x^*(3) + x(3)x^*(4))/4$$

$$\hat{C}_{x3}(3,1) = (x^*(0)x(2) + x^*(1)x(3) + x(3)x^*(1) + x(4)x^*(2))/4$$

$$\hat{C}_{x3}(3,2) = (x^*(0)x(1) + x^*(1)x(2) + x(3)x^*(2) + x(4)x^*(3))/4$$

$$\hat{C}_{x3}(3,3) = (x^*(0)x(0) + x^*(1)x(1) + x(3)x^*(3) + x(4)x^*(4))/4$$

In equation (6), each element $C_{x3}$ (k,j) of the covariance matrix indicates complex number. This indicates that each element is expressed by an expanded formula. In this case, x(n), that is, (x(0), x(1), x(2), x(3), x(4)), is respectively a complex number data, where '*' indicates a complex conjugate.

As is seen in equation (6), the covariance matrix $C_M$ is expressed by equation (7). Thus, the covariance matrix $C_M$ is a Hermite matrix (symmetric matrix of complex numbers).

$$c_{x3}(k,j) = c_{x3}^*(j,k) \quad (7)$$

Similarly, a right hand side vector vc for performing the third order process is written in equation (8).

$$\begin{bmatrix} \hat{c}_{x3}(1,0) \\ \hat{c}_{x3}(2,0) \\ \hat{c}_{x3}(3,0) \end{bmatrix} = \begin{bmatrix} (x^*(2)x(3) + x^*(3)x(4) + x(1)x^*(0) + x(2)x^*(1))/4 \\ (x^*(1)x(3) + x^*(2)x(4) + x(2)x^*(0) + x(3)x^*(1))/4 \\ (x^*(0)x(3) + x^*(1)x(4) + x(3)x^*(0) + x(4)x^*(1))/4 \end{bmatrix} \quad (8)$$

An equation to obtaining the variance $\sigma_v^2$ of input white noise is written in equation (9).

$$\hat{\sigma}_v^2 = \hat{c}_{x3}(0,0) + \sum_{k=1}^{M} \hat{a}(k) c_{x3}(0,k) \quad (9)$$

$\hat{C}_{x3}(0,0) = (x^*(3)x(3) + x^*(4)x(4) + x(0)x^*(0) + x(1)x^*(1))/4$ $\hat{C}_{x3}(0,1) = (x^*(3)x(2) + x^*(4)x(3) + x(0)x^*(1) + x(1)x^*(2))/4$ $\hat{C}_{x3}(0,2) = (x^*(3)x(1) + x^*(4)x(2) + x(0)x^*(2) + x(1)x^*(3))/4$ $\hat{C}_{x3}(0,3) = (x^*(3)x(0) + x^*(4)x(1) + x(0)x^*(3) + x(1)x^*(4))/4$ In equation (9), each term of the equation is expanded, and which are indicated in the equation.

In the linear prediction of AR model, the normal equation is obtained based on a condition where the averaged square error of subtraction between a predicted value and an observed value becomes the minimum.

By solving a normal equation using a general method, an AR coefficient is obtained.

Furthermore, based on the variance $\sigma_v^2$ of input white noise calculated with the equation (9), a power spectrum $S_{xx}(x)$ is calculated with an operation equation as indicated in equation (10).

$$Sxx(\omega) = |H_{AR}(\omega)|^2 S_{vv}(\omega) \quad (10)$$

$$= \frac{\sigma_v^2}{\left|1 + \sum_{k=1}^{M} a(k) e^{-j\omega k}\right|^2}$$

In equation (10), ω indicates angular velocity, $H_{AR}(\omega)$ is a transfer function of AR filter at an angular velocity ω. $S_{vv}(\omega)$ indicates a power spectrum of the variance of input white noise at the angular velocity ω, thus it can be expressed by $S_{vv}(\omega) = \sigma_v^2$.

By use of the operation equations above, the power of peak component detected in a frequency region of a reflection wave can be obtained.

(Averaging Process of Normal Equation)

Figure 13:
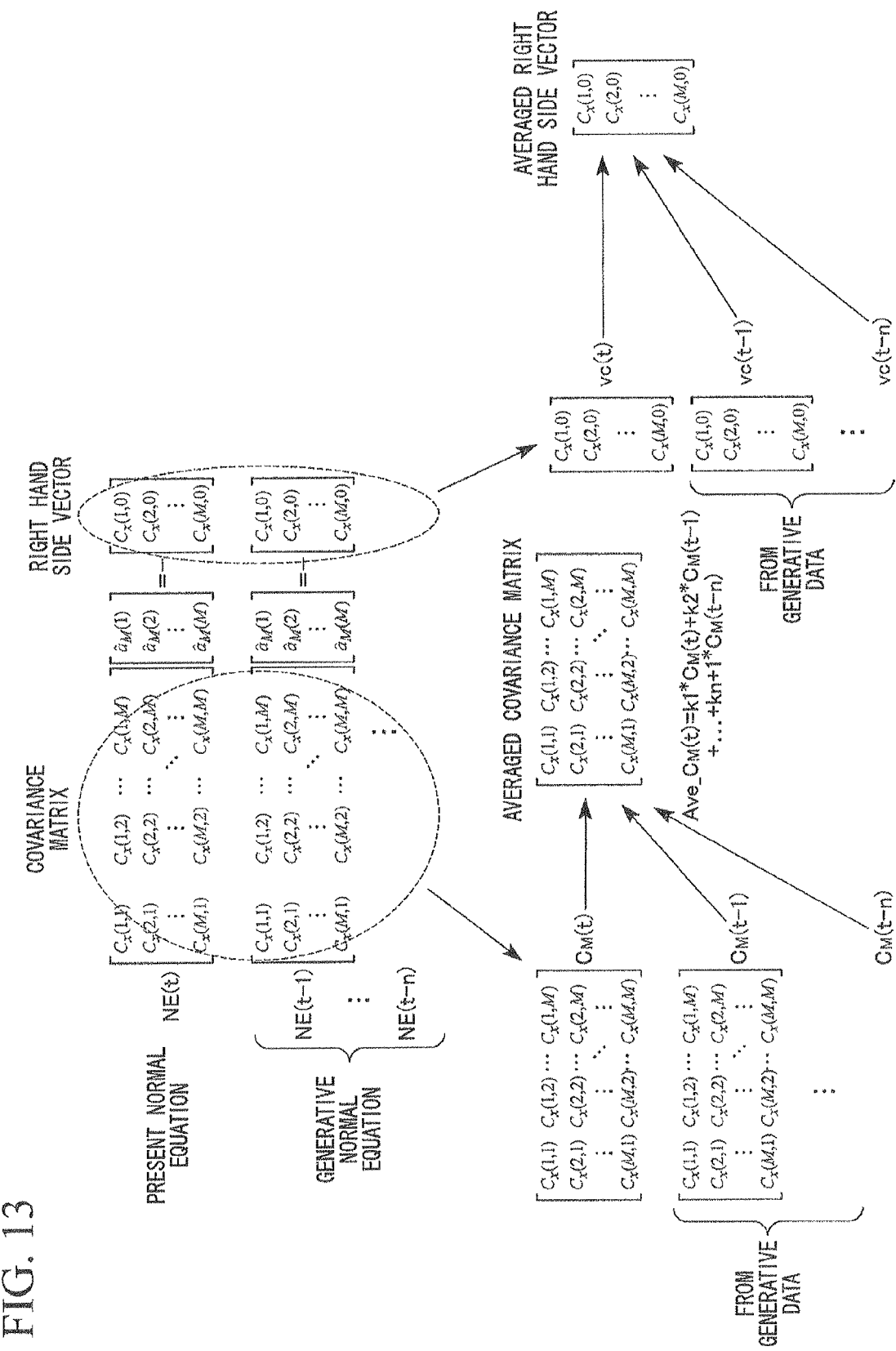
FIG. 13 is a drawing that illustrates an averaging process of normal equations for every detecting cycle.

FIG. 13 is a drawing that illustrates an averaging process of normal equations for every detecting cycle.

In the figure, "the present normal equation" is defined as a normal equation obtained based on an input data that is detected in the latest estimation process, in which the estimation process is repeatedly performed. The present normal equation is written as N(r). Further, generative normal equations, which are generated based on generative data, are respectively expressed as NE(g1), ... NE(gn).

Further, the generative normal equation indicates a normal equation that is generated based on predicted data deduced by the linear prediction operation equation.

A covariance matrix corresponding to a present normal equation NE(r) and generative normal equations NE(g1), ..., NE(gn) are expressed by covariance matrixes as $C_M(r)$, $C_M(g1)$, ..., $C_M(gn)$. Covariance matrixes $C_M(r)$, $C_M(g1)$, ..., $C_M(gn)$ are the covariance matrixes that are generated based on generative data. Further, as written in equation (11), an averaging process can be executed by adding matrixes. The averaging process of the elements of complex numbers can be executed respectively for real parts and imaginary parts of the complex numbers.

$$\text{Ave\_CM} = k1^*\text{CM}(r) + k2^*\text{CM}(g1) + \ldots + kn+1^*\text{CM}(gn) \quad (11)$$

Equation (11) shows that the average covariance matrix Ave_$C_M$ is obtained by weighting each of the covariance matrixes corresponding to the present normal equation NE(r) and generative normal equations NE(g1), ... NE(gn), where k1*, k2*, ..., kn+1* are weighted coefficient to be used. In this case, r(raw) indicates the element that is based on the input data that is detected latest. g1 (generate 1), ..., gn indicate elements based on generative data.

According to the method described above, the averaging process of covariance matrixes becomes possible.

Similar to above, right hand side vectors, which correspond to the present normal equation NE(r) and generative normal equations NE(g1), ..., NE(gn), are expressed as vc(r), vc(g1), ..., vc(gn). An averaging process of the right hand side vectors can be performed by use of addition operations as indicated in equation (12). The averaging process of elements of complex numbers can be executed respectively for real parts and imaginary parts of the complex numbers.

$$\text{Ave\_vc} = k1^*vc(r) + k2^*vc(g1) + \ldots + kn+1^*vc(gn) \quad (12)$$

Equation (12) shows that the average right hand matrix Ave_vc is obtained by weighting each of the right hand side vectors corresponding to the present normal equation NE(r) and generative normal equations NE(g1), ..., NE(gn), where k1*, k2*, ..., kn+1* are weighted coefficient to be used. In this case, r indicates the element that is based on the input data that is detected latest. g1, ..., gn indicate elements based on generative data.

According to the method described above, the averaging process of right hand side vectors becomes possible.

Therefore, with the average covariance matrix Ave_$C_M$ and the average right hand matrix Ave_vc obtained from equations (11) and (12), an averaged normal equation can be obtained, and further an AR coefficient can be obtained from the average normal equation.

Thus, based on the use of the averaged normal equation, influence of detecting errors or the like included in the detected input information can be reduced.

Thereby, in accordance with the present embodiment, the peak characteristics of a spectrum can be obtained stably, so that it becomes possible to improve the detection accuracy of angles of receiving wave.

Next, a description will be given for a specific process that averages the present AR coefficient and the past coefficient in accordance with the present embodiment.

The averaging process is mainly performed by the normal equation filer unit 306 and the target link unit 32 of the direction estimating unit 30 in FIG. 1.

FIG. 14 is a drawing that illustrates a table provided in the memory 21.

The target link unit 32 performs a process of averaging AR coefficients of the normal equation filter unit 306. In the table of FIG. 14, for individual targets, it performs a process to link among the present target data group (t), a predicted target data group (t) that is predicted from a determined past target data, and a determined past target data group (t−1), as follows.

In FIG. 14, the data group (t−1) indicates a result detected in a previous detecting cycle, which is one cycle earlier than the present detecting cycle.

The detected result of each detecting cycle includes distance r of individual targets, longitudinal position long_d (perpendicular to the arrangement of antennas), lateral position late_d (parallel to the arrangement of antennas), a relative velocity to the target, velo (i.e., v), a decent frequency point (f_dwn), a generative data CX_dwm at a decent peak frequency, all of which are stored in the memory 21 as the table format of FIG. 14. In precisely speaking, when the decent data is used for detecting the direction of a target, the generative data of decent peak frequency CX_dm needs larger storing area than the other data. However, for convenience of explanation, it is assumed that the storing area used by each of the data is identical. The longitudinal position of a target, long_d, and the lateral position of a target, late_d, can be obtained from an angle (incoming angle of a receiving wave) between the radar and the target, and the distance r between the radar and the target. For an angle θ and a distance r, a longitudinal position long_d is calculated by r·cos θ, and the lateral position late_d is calculated by r·sin θ. Further, the target link unit 32 predicts, in advance, a target distance r, a longitudinal position long_d, a lateral position lat_d, a relative velocity velo, and a peak frequency point for each of targets in the present detecting cycle based on the past determined group data, i.e., the target distance r, the longitudinal position long_d, the lateral position late_d, and the relative velocity velo. For example, a predicted target group data, i.e., a longitudinal position long_d, a lateral position late_d and a peak frequency point gives a mobile range of a target at time after a single detecting cycle based on a past target group data, i.e., a distance r, a longitudinal position long_d, the lateral position late_d and a relative velocity volo. The prediction of a relative velocity can be performed by calculating a slope of changes in relative velocities or the like for a couple of past cycles.

For example, the target link unit 32 establishes a predetermined mobile range of a target, a predetermined range of frequency points, and a predetermined range of relative velocities to correspond to predetermined past data, that is, a target distance r, a longitudinal position long_d, a lateral position late_d, a frequency point, and a relative velocity against a target. Then, the target link unit 32 performs association between targets based on whether each of calculated values of the present detecting cycle is positioned within the corresponding range or not. If each of the calculate values is out of the range, and then the target link unit 32 determines that the target is a different one.

In FIG. 14, if the target of the present target is associated with a past target of the past detection cycle, and then the target link unit 32 transfers the result of the present detecting cycle to the past target data group (t−1) and proceeds with the calculation of a prediction result in the next detecting cycle.

In addition, the target link unit 32 clears, when any past target cannot be associated with the present target group data, the information of the past target.

Namely, if the target positioned at a distance where the multipath effect occurs, which causes a detecting cycle to unable to detect the peak of the beat frequency, and then a filtering effect by use of the result of the detecting cycle in the past one cycle is reset. In the case of the present embodiment shown in FIG. 14, the result of the target in the past single detecting cycle is stored in the memory 21.

Further, when the target link unit 32 detects a past target that has not been associated with the present target group data, the target link unit 32 may maintain the result of the past target being determined for a predetermined number of cycles.

In addition, as the stored results are updated in order, a prediction result based on the past results is also updated accordingly. Even if a target is not detected in the present detecting cycle because of the multipath effect or the like, if the target is associated later than the next cycle, the target link unit 32 can use, for the filtering process, the past data corresponding to a number excluding the number of cycles where the target is not detected because of the multipath effect or the like.

Further, similar to the extrapolation method of tracking control, for a detecting cycle where the peak value is not detected, the prediction result above is used as being the result obtained in the present cycle, so that the existence condition of a target can be maintained.

Figure 15:
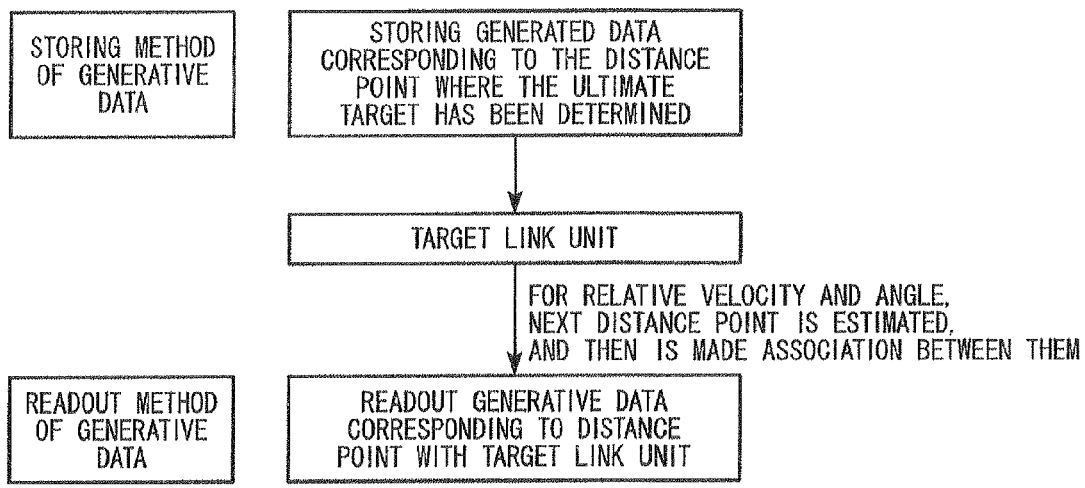
FIG. 15. is a drawing that illustrates a storing and read-out method of generated data.

FIG. 15 is a drawing that illustrates a storing and readout methods of generative data. In the storing method of generative data shown in the figure, the target link unit 32 makes association with the distance point where the target is ultimately determined, and then the generative data is stored into the memory 21.

Thereby, the direction estimating unit 30 can associate information on the distance point as a key element with the target.

Further, in the readout method of generative data indicated in the figure, it becomes possible for the target link unit 32 to choose the estimation range based on the information on the point distance corresponding to a target that has already been detected. In this way, the data processing efficiency can be improved. Namely, the target link unit 32 can narrow a range of data based on the relative velocity, the angle to the target, when referring to the generative data stored in the memory. In the next detecting cycle, it becomes possible to choose an estimated range based on the information of the distance point corresponding to the target that has already been detected. Thereby, the target link unit 32 can improve its data process efficiency. In this way, as the target link unit 32 can refer to the generative data corresponding to the distance point of limited range, the accuracy of data readout can be increased.

Second Embodiment

With reference to figures, a description will be given for another aspect of AR spectrum estimation method applied in a second embodiment in accordance with the present invention.

A description is given for another aspect of the direction estimating unit 30 of the electronic scanning radar apparatus indicated in FIG. 1. The identical symbols are used for the identical components of FIG. 1.

Figure 16:
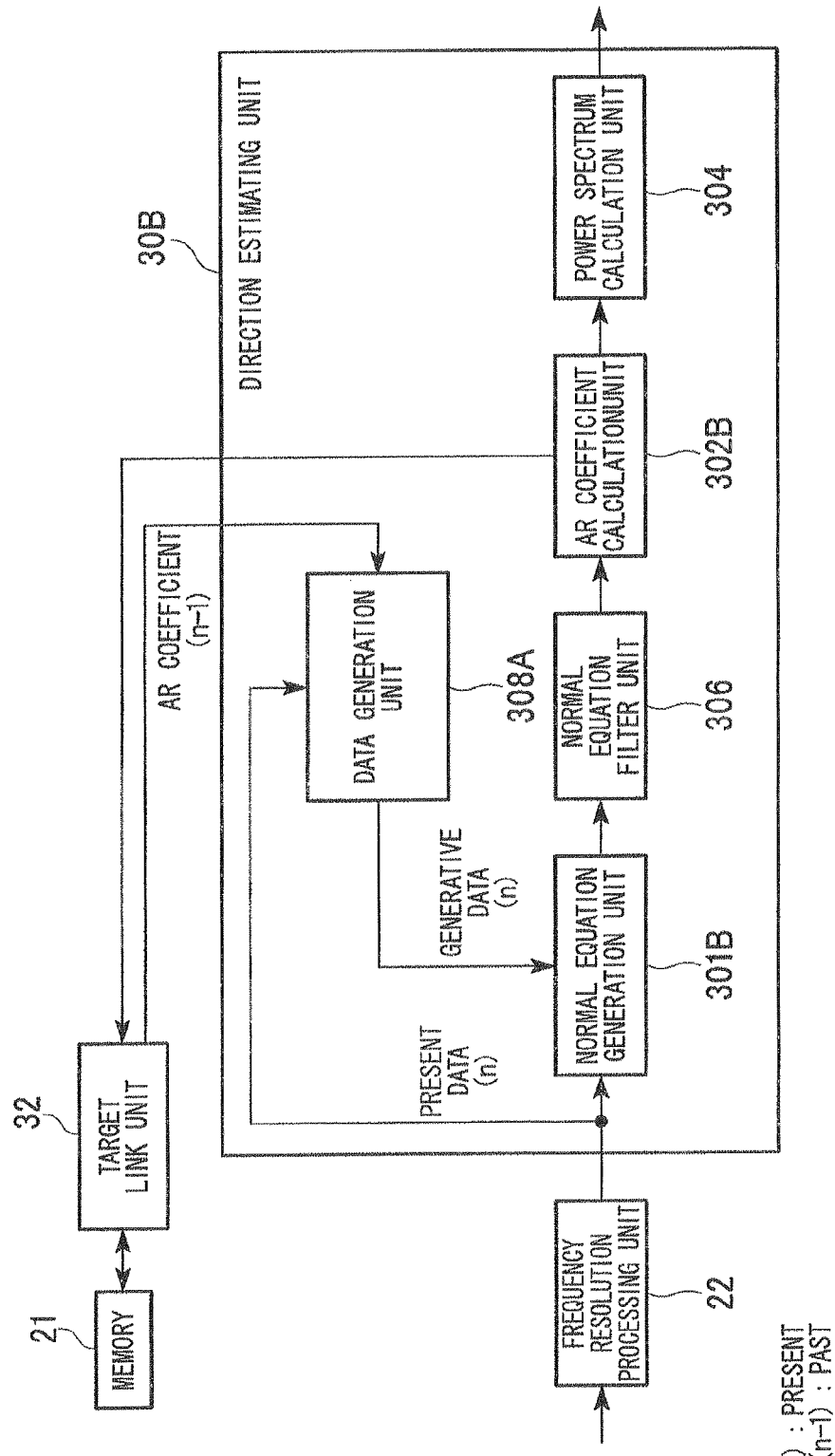
FIG. 16 a block diagram that illustrates a direction estimating unit of an electronic scanning radar apparatus in accordance with a second preferred embodiment of the present invention.

FIG. 16 is a block diagram that illustrates an aspect of configuration of the direction estimating unit in accordance with the second embodiment.

A direction estimating unit 30A corresponds to the direction estimating unit 30 of FIG. 1. This shows more specifically as an example of configurations for performing the AR spectrum estimation process, which is known as a high accuracy algorithm of a spectrum estimation process.

The direction estimating unit 30B includes a normal equation generation unit 301B, an AR coefficient calculation unit 302B, a power spectrum calculation unit 304, a normal equation filter unit 306, and a data generation unit 308B.

The normal equation generation unit 301B of the direction estimating unit 30B generates a normal equation required for the AR spectrum estimation process. The normal equation generation unit 301B generates a normal equation led from each of complex number data according to a beat frequency (at either ascent or decent region or both ascent and decent regions) that is obtained by frequency resolution performed by the frequency resolution processing unit 22.

Further, the normal equation generation unit 301B generates a normal equation (generative normal equation) to be led from the complex number data (generative complex number data) generated by the data generation unit 308B in the present detecting cycle.

The AR coefficient calculation unit 302B calculates an AR coefficient led based on an averaged normal equation averaged by the normal equation filter unit 306 and a variance $\sigma_v^2$ of white noise. Thereby, the AR coefficient calculation unit 302B can perform, for each antenna, in response to the detecting cycle, spectrum estimation based on the complex number data of a beat frequency of which a target is detected.

The AR coefficient calculation unit 302B makes a target link unit 32 store the AR coefficient obtained in the present detecting cycle into the memory 21.

The data generation unit 308B generates, based on the detected complex number data and the AR coefficient led by the AR coefficient calculation unit 302B in the past detecting cycle, a generative data to be used in the present detecting cycle. The data generation unit 308B makes the target link unit 32 refer the memory 21, and readouts the generative AR coefficient. The data generation unit 308B makes the target link unit 32 store the generative AR coefficient into the memory 21.

The AR coefficient generated by the AR coefficient calculation unit 302B is stored into the memory 21. The generative AR coefficient is provided from the target link unit 32 according to the instructions of that the target link unit 32.

Next, an explanation will be given for a specific process which takes an average between the present normal equation and the past normal equation in accordance with the present embodiment.

This averaging process is mainly performed by the normal equation filter unit 306 and the target link unit 32 in FIG. 1.

FIG. 17 is a drawing that illustrates a table provided in the memory 21.

The target link unit 32 performs a processing for linking among the present target group (t), the estimated target (t) estimated from the determined past target and the determined past target (t−1) for the averaging process of the normal equations at the normal equation filter unit 306, as described below.

In FIG. 17, the data group (t−1) indicates a result detected in a previous detecting cycle, which is one cycle earlier than the present detecting cycle.

The detected result of each detecting cycle includes distance r of individual targets, longitudinal position long_d (perpendicular to the arrangement of antennas), lateral position late_d (parallel to the arrangement of antennas), a relative velocity to the target, velo (i.e., v), a decent frequency point (f_dwn), an AR coefficient AR_C_dwm at a decent peak frequency (i.e, hat $a_{M}$), all of which are stored in the memory 21 as the table format of FIG. 17. In precisely speaking, when the decent data is used for detecting the direction of a target, the AR coefficient AR_C_dwm at the decent peak frequency needs larger storing area than the other data. However, for convenience of explanation, it is assumed that the storing area used by each of the data is identical. The longitudinal position of a target, long_d, and the lateral position of a target, late_d, can be obtained from an angle (incoming angle of a receiving wave) between the radar and the target, and the distance r between the radar and the target. For an angle θ and a distance r, a longitudinal position long_d is calculated by r·cos θ, and the lateral position late_d is calculated by r·sin θ. Further, the target link unit 32 predicts, in advance, a target distance r, a longitudinal position long_d, a lateral position lat_d, a relative velocity velo, and a peak frequency point for each of targets in the present detecting cycle based on the past determined group data, i.e., the target distance r, the longitudinal position long_d, the lateral position late_d, and the relative velocity velo. For example, a predicted target group data, i.e., a longitudinal position long_d, a lateral position late_d and a peak frequency point gives a mobile range of a target at time after a single detecting cycle based on a past target group data, i.e., a distance r, a longitudinal position long_d, the lateral position late_d and a relative velocity volo. The prediction of a relative velocity can be performed by calculating a slope of changes in relative velocities or the like for a couple of past cycles.

For example, the target link unit 32 establishes a predetermined mobile range of a target, a predetermined range of frequency points, and a predetermined range of relative velocities to correspond to predetermined past data, that is, a target distance r, a longitudinal position long_d, a lateral position late_d, a frequency point, and a relative velocity against a target. Then, the target link unit 32 performs association between targets based on whether each of calculated values of the present detecting cycle is positioned within the corresponding range or not. If each of the calculate values is out of the range, and then the target link unit 32 determines that the target is a different one.

In FIG. 17, if the target of the present target is associated with a past target of the past detection cycle, and then the target link unit 32 transfers the result of the present detecting cycle to the past target data group (t−1) and proceeds with the calculation of a prediction result in the next detecting cycle.

In addition, the target link unit 32 clears, when any past target cannot be associated with the present target group data, the information of the past target.

Namely, if the target positioned at a distance where the multipath effect occurs, which causes a detecting cycle to unable to detect the peak of the beat frequency, and then a filtering effect by use of the result of the detecting cycle in the past one cycle is reset. In the case of the present embodiment shown in FIG. 17, the result of the target in the past single detecting cycle is stored in the memory 21.

Further, when the target link unit 32 detects a past target that has not been associated with the present target group data, the target link unit 32 may maintain the result of the past target being determined for a predetermined number of cycles.

In addition, as the stored results are updated in order, a prediction result based on the past results is also updated accordingly. Even if a target is not detected in the present detecting cycle because of the multipath effect or the like, if the target is associated later than the next cycle, the target link unit 32 can use, for the filtering process, the past data corresponding to a number excluding the number of cycles where the target is not detected because of the multipath effect or the like.

Further, similar to the extrapolation method of tracking control, for a detecting cycle where the peak value is not detected, the prediction result above is used as being the result obtained in the present cycle, so that the existence condition of a target can be maintained.

In addition, in the readout method of an AR coefficient indicated in the figure, the target ling unit 32 becomes to enable to choose an estimation range based on the distance point information corresponding to the detected target, so that it can improve the processing efficiency. Namely, the target link unit 32 can narrow the range based on the relative velocity to the target and the angle when referring to a stored AR coefficient. Moreover, in the detecting cycle for the next time, it becomes possible to choose the estimation range based on the information of the distant point related to the target that has already been detected. In this way, the target link unit 32 can improve the processing efficiency. As the target link unit 32 can refer to the AR coefficient corresponding to the distance point in the limited range, it can improve the readout accuracy of data.

Figure 18:
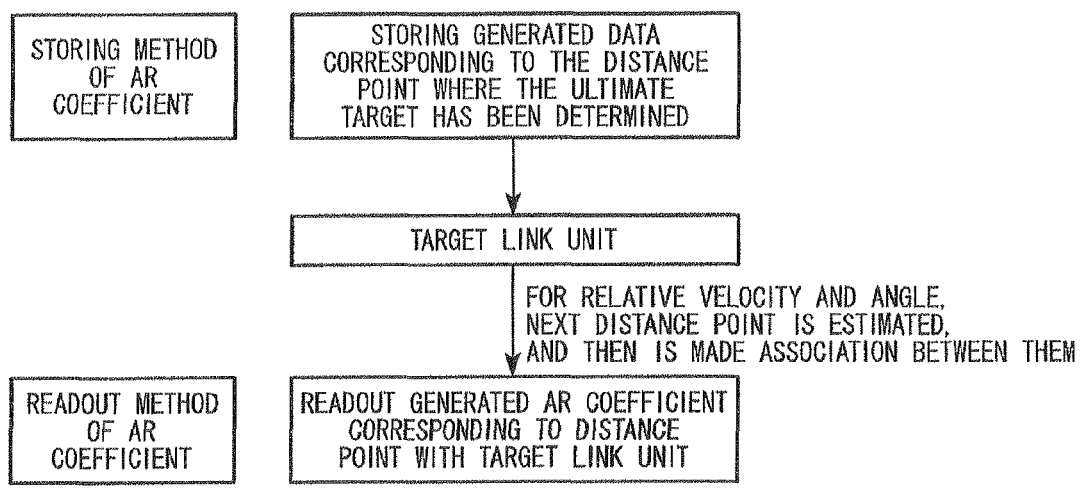
FIG. 18 is a drawing that illustrates a storing and read-out methods of AR coefficients.

FIG. 18 is a diagram that illustrates the store and readout methods of an AR coefficient.

In the AR coefficient store method indicated in the figure, the target link unit 32 stores an AR coefficient into the memory 21, associating with the distance point which is ultimately determined as a target.

Thereby, the direction estimating unit 30 can make association with the target based on the distance point as key information.

Further, in the AR readout method indicated in the figure, the target link unit 32 becomes possible to choose the estimation range based on the information of the distance point corresponded to the detected target, so that it can improve the processing efficiency. Namely, the target link unit 32 can narrow the range based on the relative velocity to the target and the angle when referring to a stored AR coefficient. Moreover, in the detecting cycle for the next time, it becomes possible to choose the estimation range based on the information of the distant point related to the target that has already been detected. In this way, the target link unit 32 can improve the processing efficiency. As the target link unit 32 can refer to the AR coefficient corresponding to the distance point in the limited range, it can improve the readout accuracy of data.

(Procedure of Incoming Direction Estimating Method of Receiving Wave)

Next, a description will be given for the procedure of estimating the coming direction of a receiving wave in the direction estimating unit 30B.

Figure 19:
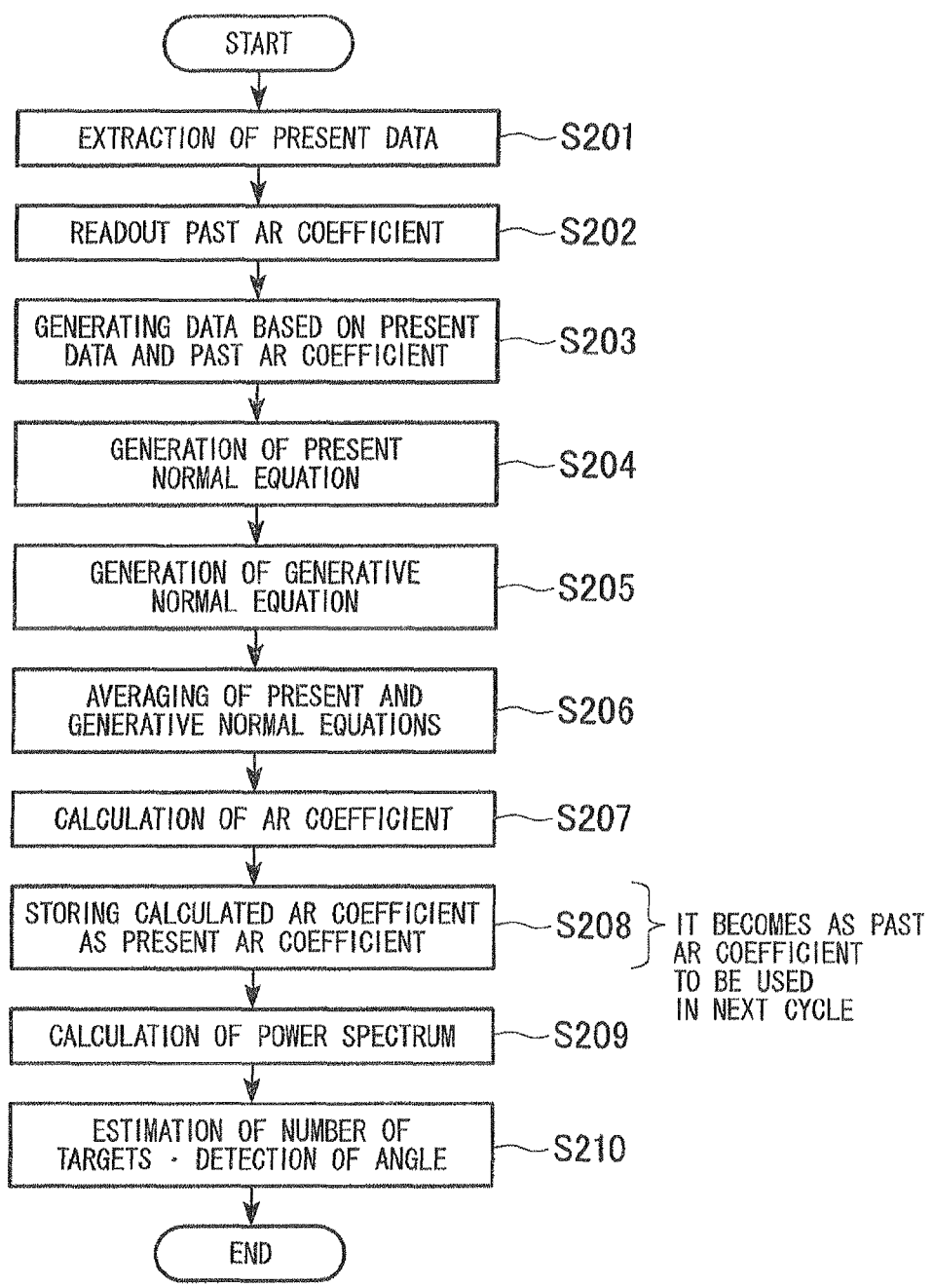
FIG. 19 is a flowchart illustrating data processing of a target direction estimation process in an electronic scanning radar apparatus in accordance with a preferred embodiment of the present invention.

FIG. 19 is a flowchart that illustrates the process flow of a direction estimating process of a target using the electronic scanning radar apparatus.

In the following, a description will be given for another aspect of a procedure for averaging between a covariance matrix of a normal equation and a right hand side vector.

In step S201, the frequency resolution processing unit 22 extracts the present complex number data (present data) resulted from a frequency resolution analysis, in which the present complex number data corresponds to the distance point of a reflecting object (target).

In step S202, the target link unit 32 reads out the past AR coefficient (previous AR coefficient) by referring to the memory 21 in response to the request of the data generation unit 308B.

In step S203, the data generation unit 308B generates data (generative complex number data) based on the present data and the previous AR coefficient read from the memory 21.

In step S204, the normal equation generation unit 301B generates a covariance matrix and a right hand side vector based on the present data, and sets them as elements of a present normal equation (present equation).

In step S205, the normal equation generation unit 301B generates a covariance matrix and a right hand side vector based on the generative complex number data that is generated based on the calculated AR coefficient (previous AR coefficient) in the previous processing cycle, and sets them as the elements of the generative normal equation.

In step S206, the normal equation filter unit 306 takes an average between the present normal equation and the generative normal equation (generative normal equation).

In step S207, the AR coefficient calculation unit 302B generates an AR coefficient by solving the averaged normal equation and a variance $\sigma_v^2$ of white noise.

In step S208, the AR coefficient calculation unit 302B stores the generative AR coefficient into the memory 21 as a present AR coefficient.

Successively, in step S209, the power spectrum calculation unit 304 obtains a power spectrum. The power spectrum is obtained based on the AR coefficient and the variance $\sigma_v^2$ of white noise, in which their accuracy is improved by the present data and the generative data.

In step S210, the power spectrum calculation unit 304 determines the peak of the power spectrum as a detected target, sets the number of the peak as a detected number of peak, and determines the angle indicated by the detected peak as a receiving angle of the incoming received wave.

As described in the processing above, in the first half step, the AR coefficient is read out in the step S202. In step S203, the generative data is generated based on the present data and the AR coefficient called in step S202. Further, in step S205, the averaging process is performed each of the elements of the normal equation of the present data and the elements of the generative normal equation of the generative data. Successively, in the latter half step, the AR coefficient with improved accuracy is calculated in step S207, and which is stored into the memory 21 for the next time. In step S209, with the identical AR coefficient, the power spectrum is calculated. In this case, in addition to the averaging process of the variance matrix and the right hand side vector, an AR coefficient may be obtained every time, for averaging the AR coefficient. The variance $\sigma_v^2$ of white noise can be averaged in the same manner as the AR coefficient is done.

The electronic scanning radar apparatus described in the present embodiment, it becomes possible to reduce the amount of data set to be called. In this case, the data set stored into the memory 21 is only the previous AR coefficient. By storing the previous AR coefficient instead of the complex number data, the storing capacity used for storing data set can be greatly reduced.

Third Embodiment

With reference to figures, a description will be given for an another aspect of the AR spectrum estimation method applied to a third embodiment in accordance with the present invention.

A description will be given for another aspect of the direction estimating unit 30 of the electronic scanning radar apparatus shown in FIG. 1. For the configurations identical to those of FIG. 1, the corresponding symbols are assigned.

Figure 20:
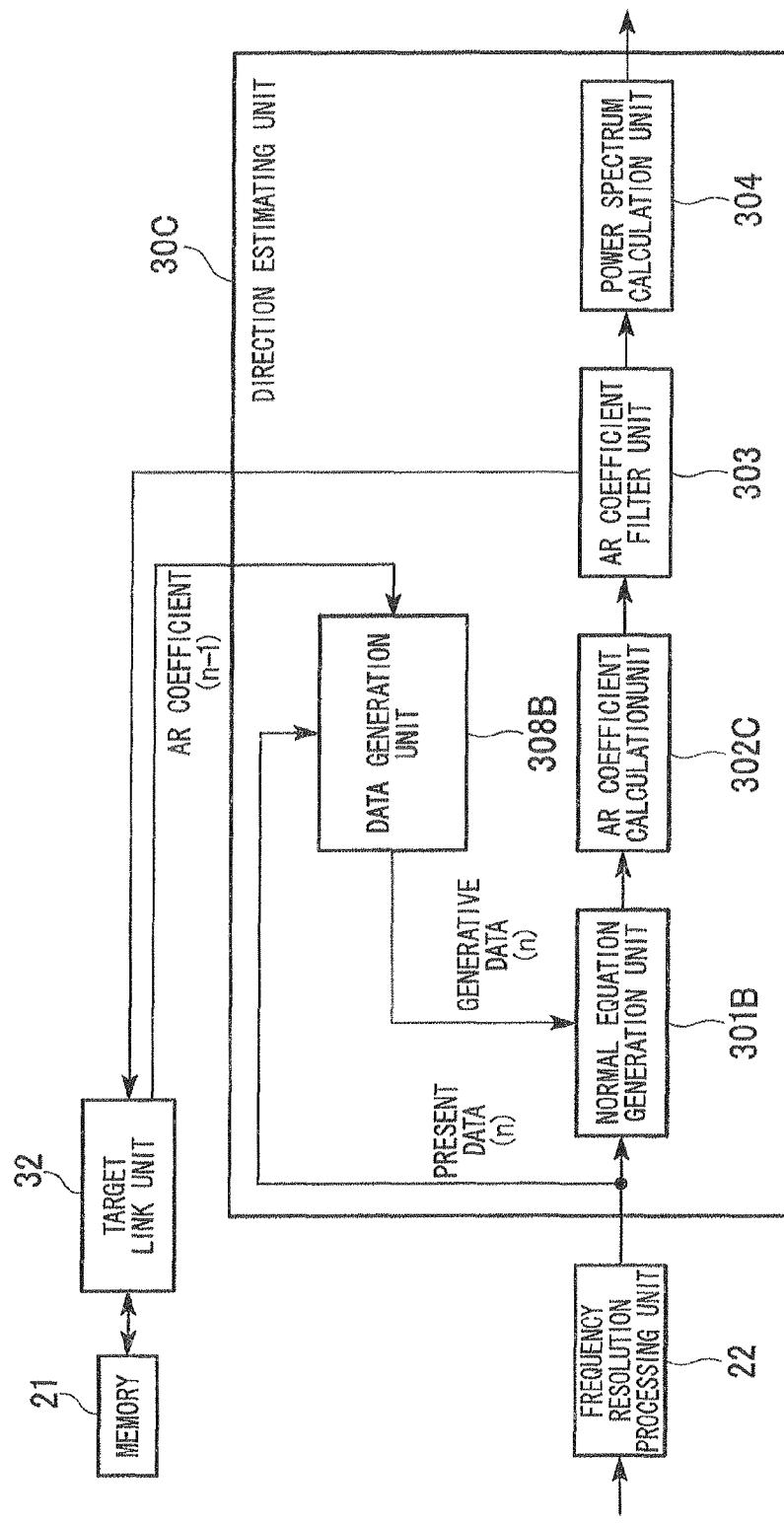
FIG. 20 is a block diagram that illustrates a direction estimating unit of an electronic scanning radar apparatus in accordance with a third preferred embodiment of the present invention.

FIG. 20 is a block diagram that illustrates an aspect of the configuration of the direction estimating unit of the third embodiment.

The direction estimating unit 30C indicated in the figure corresponds to the direction estimating unit 30 of FIG. 1. It describes more specifically as an example of configurations for performing the AR spectrum estimation process, which is known as a high accuracy algorithm of a spectrum estimation process.

The direction estimating unit 30C includes a normal equation generation unit 301B, an AR coefficient calculation unit 302C, an AR coefficient filter 303, a power spectrum calculation unit 304, and a data generation unit 308B.

The AR coefficient calculation unit 302C of the direction estimating unit 30C calculates an AR coefficient that is led based on a normal equation generated by the normal equation generation unit 301A, and calculates a variance $\sigma_v^2$ of white noise. In this way, the AR coefficient calculation unit 302C can calculate, in response to the detecting cycle for each antenna, an AR coefficient based on the complex number data of a detected beat frequency of which an existence of a target is detected.

The AR coefficient filter 303 takes an averaging process of the calculated AR coefficient and makes the target link unit 32 store the averaged AR coefficient into the memory 21. The stored AR coefficient is called by the target link unit 32 and is provided to the data generation unit 308B.

Further, FIG. 17 is seen as a data table defined in the storing area of the memory 21 in accordance with the third embodiment.

It refers to FIG. 18 as the method of storing and referring to the AR coefficient stored in the table shown in FIG. 17.
(Procedure of Incoming Direction Estimating Process of Receiving Wave)

Next, a description will be given for the incoming (receiving) direction estimating procedure in the direction estimating unit 30C.

Figure 21:
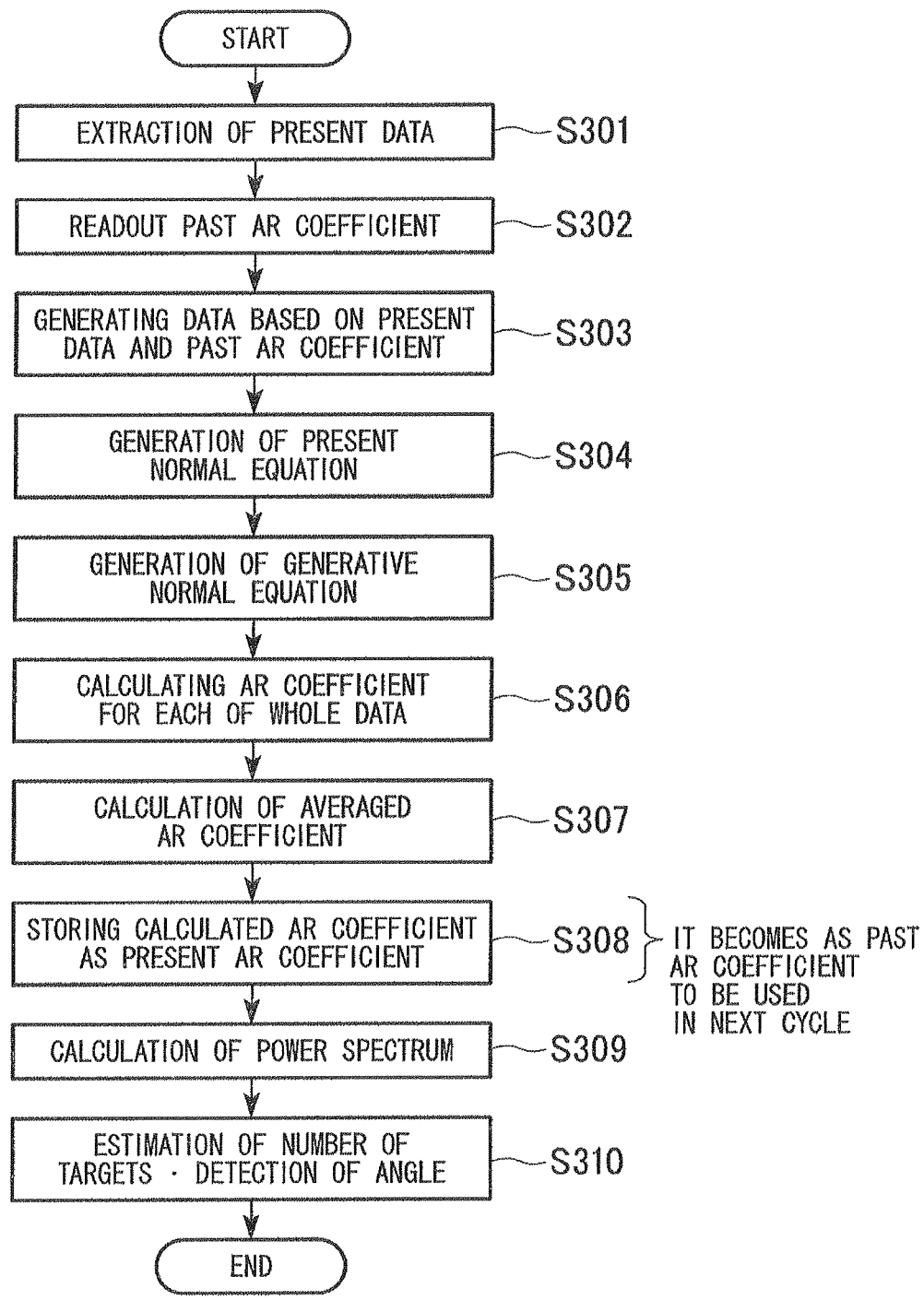
FIG. 21 is a flowchart illustrating data processing of a target direction estimation process in an electronic scanning radar apparatus in accordance with a preferred embodiment of the present invention.

FIG. 21 is a flow chart that illustrates a direction estimating process flow of a target by the electronic scanning radar.

In the following, a description is given for another aspect of the procedure for averaging a covariance matrix of a normal equation and a right hand side vector.

The process steps S301 through S305 described in the third embodiment are identical to those of S201 through S205 described in the second embodiment.

Successively, in step S306, the AR coefficient calculation unit 302C obtains AR coefficients by solving each of normal equations generated for the whole data. Further, the AR coefficient calculation unit 302C obtains a variance $\sigma_v^2$ of input white noise.

In step S307, the AR coefficient filter unit 303 performs the averaging process based on the weighted coefficient for each of obtained AR coefficients.

In step S308, the AR coefficient filter unit 303 stores the averaged AR coefficient into the memory 21 as the present AR coefficient.

Further, in step S309, the power spectrum calculation unit 304 obtains a power spectrum. The power spectrum is obtained based on the present AR coefficient with improved accuracy by the present data and the generative data and the variance $\sigma_v^2$ of input white noise. In step S310, the power spectrum calculation unit 304 determines the peak of the power spectrum as a detected target, sets the number of the peak as a detected number of peaks, and determines the angle indicated by the detected peak as a receiving angle of the incoming received wave.

As described in the processing above, in the first half step, the AR coefficient is called in the step S302. In step S303, the generative data is generated based on the present data and the AR coefficient called in step S302. Further, in steps S304 and S305, the normal equation and the generative equation are generated. Successively, in the latter half step, each AR coefficient is calculated in step S306. In step S307, the averaging process is performed for the calculated AR coefficient. In step S308, the averaged AR coefficient is stored into the memory 21 for the next time. In step S309, with the identical AR coefficient, the power spectrum is calculated.

From the normal equation for every whole input data, all AR coefficients are obtained and those are performed by the averaging process. To use the averaged AR coefficient is a modification point from the second embodiment. Similarly, the averaging process can be applied to the variance $\sigma_v^2$ of input white noise.

The electronic scanning radar apparatus described in the third embodiment can reduce the amount of data sets for storage and readout. The data set to be stored into the memory 21 is a previous AR coefficient. By storing the previous AR coefficient into the memory 21 instead of the complex number data, the storage area can be greatly reduced.

Figure 22:
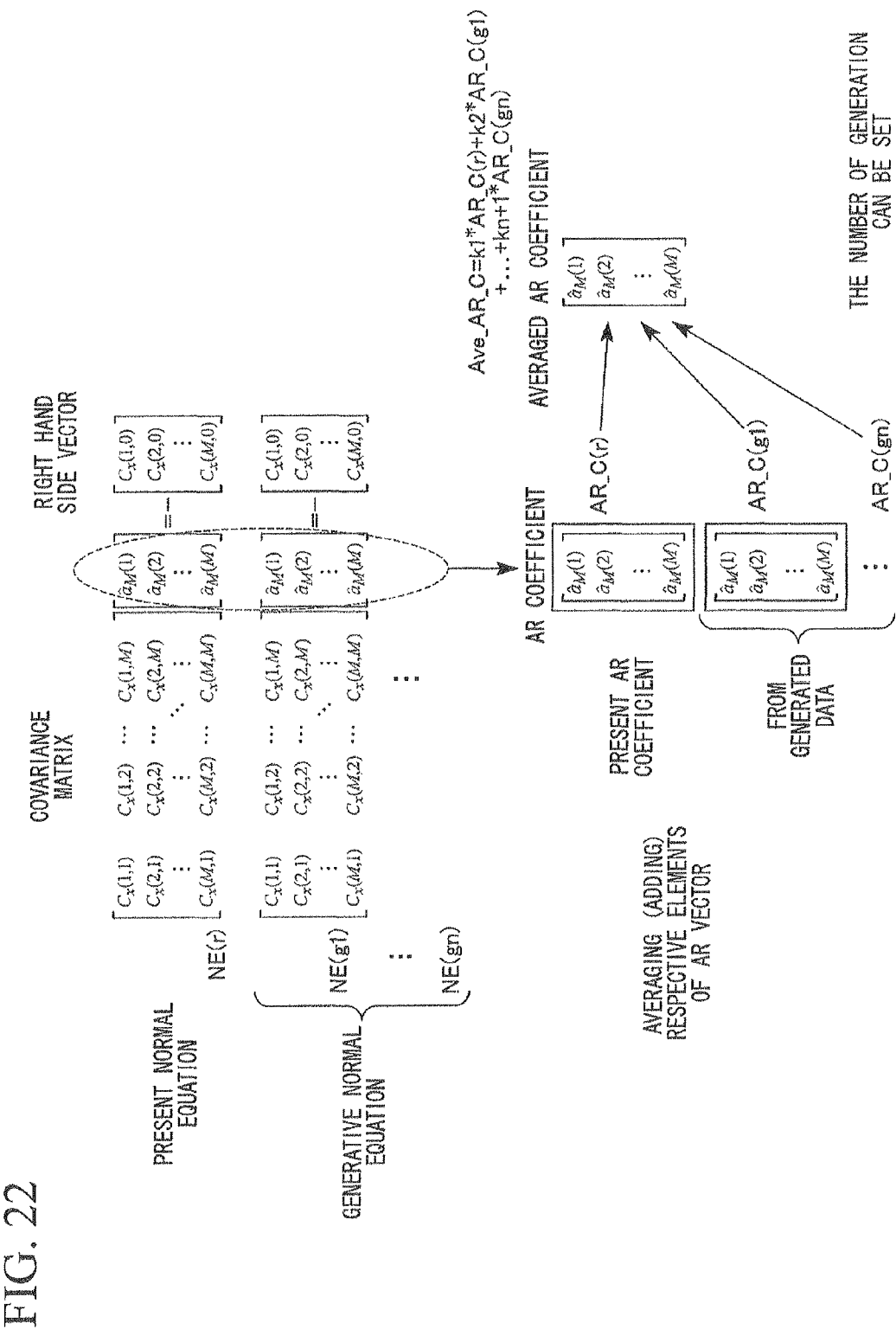
FIG. 22 is a drawing that illustrates an averaging process of AR coefficients in each detecting cycle.

FIG. 22 is a drawing that illustrates an averaging process of AR coefficients in each detecting cycle.

In the figure, "the present normal equation" corresponds to a normal equation that is obtained based on the input data detected last in the estimation process repeatedly performed, which is written as the present normal equation NE(r). Further, generative equations generated based on the generative data is written as NE(g1), . . . , NE(gn). By solving the present normal equation NE(r) and the generative normal equation (NE(g1), . . . , NE(gn), the AR coefficient can be obtained.

The AR coefficients corresponding to the present normal equation NE(r) and the generative normal equation (NE(g1), . . . , NE(gn) are written as A(r), A(g1), . . . , A(gn), and which can be averaged with the addition operation of vectors as indicated in equation (13). The averaging process of the elements of complex numbers can be performed for the real parts and the imaginary parts, respectively.

$$\text{Ave\_AR\_C}=k1^*\text{AR\_C}(r)+k2^*\text{AR\_C}(g1)+\ldots+kn+1^*\text{AR\_C}(gn) \quad (13)$$

Equation (13) shows that the averaged AR coefficient Ave_AR_C is obtained by adding AR coefficients of the present normal equation. NE(r), the generative normal equations NE(g1), . . . , N(gn), which are respectively weighted by corresponding weighted coefficient. The weighted coefficients to be set is written as k1*, k2*, . . . , kn+1*.

Base on the method described above, the averaging process of AR coefficients becomes possible.
(Averaging Process at Present and Past AR Coefficients by AR Coefficient Filter 303 of Direction Estimating Unit 30)

In the following, a description will be given for a specific procedure of averaging the present AR coefficient and the past AR coefficients in accordance with the present embodiment.

This averaging process is mainly performed by the AR coefficient filter unit 303 of the direction estimating unit 30 and the target link unit 32 in FIG. 20.

A description is given of the table provided in the memory 21 with reference to FIG. 17.

For performing the averaging process of AR coefficients at the AR coefficient filter unit 303, the target link unit 32 performs the following process, with the table of FIG. 17, for linking among each of the present target group (t), the predicted target (t) which is predicted based on the determined past target data, and the determined target (t−1) which is determined in the past.

(t−1) in FIG. 17 indicates the result obtained in a (previous) detecting cycle that is performed one cycle prior to the latest cycle.

As each detection result, for each determined target, which includes data of a distance r, a longitudinal position long_d (perpendicular to the arrayed direction of the antennas), a lateral position late_d (parallel to the arrayed direction of the antennas), a relative velocity to the target velo (i.e., v), a frequency point f_dwn indicating a frequency point in the descent, an AR coefficient AR_C_d n indicating an AR coefficient in the descent (i.e., hat $a_M$), and those of which are stored in the memory 21 with the form of a table format of FIG. 17. (e.g., the example of the table area is set to be constant for convenience of explanation, while a data storing area of the AR coefficient AR_C_dwn becomes larger than the other parts of the table when the data of descent region is used for detecting the direction.) In this case, the long_d and late_d are obtained from the angle to the target (an incoming angle of a receiving wave) and the distance r. When the angle and the distance are denoted as θ and r respectively, the longitudinal poison long_d is given by r·cos θ, and the lateral position late_d is given by r·sin θ.

Further, the target link unit 32 preliminary predicts a distance r, a longitudinal poison long_d, a lateral position late_d, a relative velocity velo and a peak frequency point in the present detecting cycle for each target based on the previously determined distance r, determined longitudinal poison long_d, determined lateral position late_d, and determined relative velocity velo. For example, estimations of the distance r, the longitudinal poison long_d, the lateral position late_d, the relative velocity velo and the peak frequency point are used to estimate a mobile range at the time when the detecting cycle has been completed based on the previously determined the distance r, the longitudinal poison long_d, the lateral position late_d, and the relative velocity velo. The relative velocity can be predicted by calculating the slope of variation of the relative velocities for predetermined number of cycles.

For example, the target link unit 32 establishes a predetermined mobile range, a frequency point range, and a relative velocity range which correspond to the distance r, the longitudinal position long_d, the lateral position late_d, the peak frequency point and the relative velocity that are estimated based on the previously estimated result. The target link unit 32 makes links if each of results in the present cycle is within its corresponding range, and if they are out of ranges, then the target link unit 32 determines that the target in the present cycle is another target.

Further, when the target in the present cycle corresponds to the past target, then the target link unit 32 transfers the result of the present detecting cycle to the result (t−1) in the table of FIG. 17, and then calculates a result of the next detecting cycle.

Further, when there is a past target that is not associated with any of the results of the present target groups, the target link unit 32 clears all of the data of the past target.

This means that a filtering effect using the results of the past target group is to be reset when the target approaches in a distance where multipath effect is caused and it becomes a detecting cycle which does not provide a peak of the beat frequency to be detected. For the present embodiment shown in FIG. 17, the memory 21 stores the past result of targets for a single past detecting cycle.

The target link unit 32 may be configured to maintain previous (past) determined results of targets for a predetermined number of cycles, even if there is the past target which is not associated with targets of the present detecting cycle.

Further, as stored results are updated in order, the estimation results based on the past results are also updated in order. For a filtering process, the target link unit 32 may be configured to be able to use the past data for a number of detecting cycles more than the number of cycles where a peak is not detected due to a multipath effect or the like, if the target becomes associated with the past data in next or further detecting cycles, even if the target cannot be detected due to the multipath effect at the present detecting cycle.

Further, being similar to an extrapolation method of tracking control, when no peak is detected in a detecting cycle, it is still possible that the estimation result described above is used as the result of the present detecting cycle, and then an existence status of the target is maintained.

For the read-out method of AR coefficient of FIG. 18, the target link unit 32 can improve data process efficiency as an extent of estimation becomes selectable based on information of the distance point corresponding to the target which has been previously detected. The target link unit 32 estimates a next distance point with the relative velocity and the angle, and then associates them. Namely, the target link unit 32 can set limits to the extent of estimation based on the relative velocity and the angle against the target when the target link unit 32 refers stored AR coefficients. Further, in a subsequent detecting cycle, the target link unit 32 becomes to be able to select the extent of estimation based on the information of the distance point which corresponds to a previously detected target. The previously detected target may be referred to as a past target. Accordingly, the target link unit 32 can improve its process efficiency. Since the target link unit 32 can refer to the AR coefficients, which correspond to distance points in a limited range (extent), the target link unit 32 can improve the accuracy of a read-out of AR coefficients.

Fourth Embodiment

Further, the electronic scanning radar apparatus in accordance with a fourth preferred embodiment is explained with reference to figures.

Figure 23:
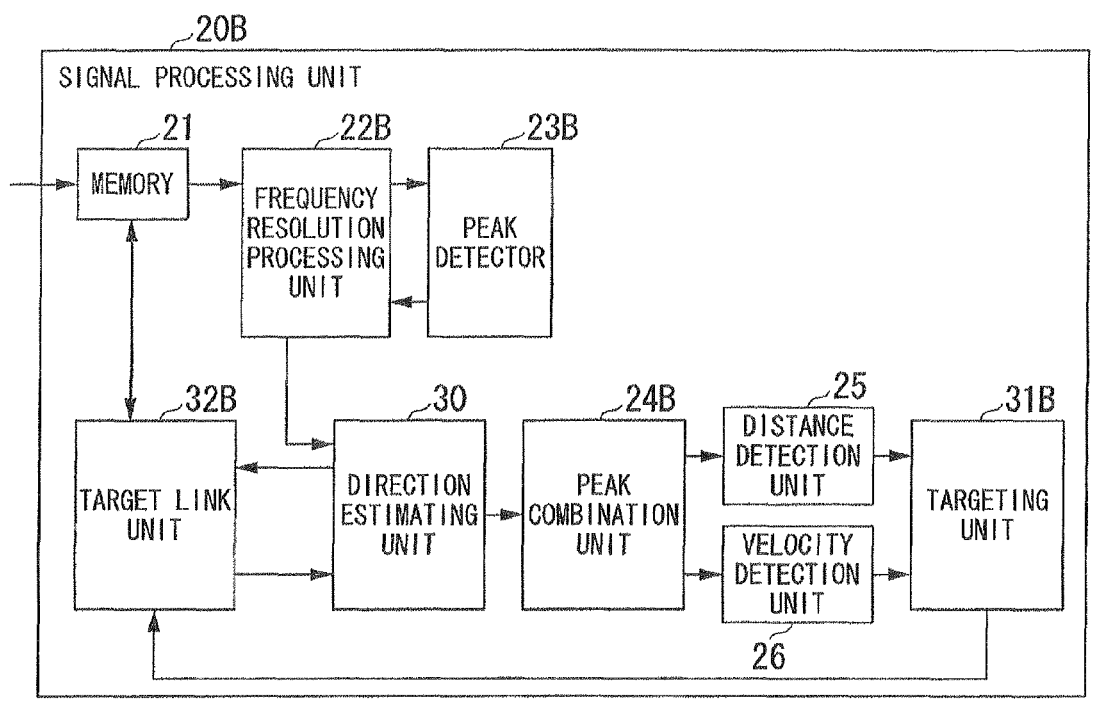
FIG. 23 is a block diagram that illustrates a direction estimating unit of an electronic scanning radar apparatus in accordance with a fourth preferred embodiment of the present invention.

FIG. 23 is a block diagram that illustrates an example of the signal processing unit of an electronic scanning radar apparatus in accordance with a fourth preferred embodiment of the present invention.

Similar to the first embodiment, in the fourth embodiment, a direction estimation is performed based on a high resolution algorithm. In the figure, for the portions identical to those of the configuration in accordance with the first embodiment shown in FIG. 1, the identical symbols are assigned, and the different points from the first embodiment will be described below.

In the signal processing unit 20C, the frequency resolution processing unit 22B transforms beat signals of each antenna for an ascent and a descent into the complex number data. Then, the frequency resolution processing unit 22B transmits frequency points indicating the beat frequencies and the complex number data to a peak detector 23B.

Further, the peak detector 23B detects peak values in the ascent and the descent and frequency points which correspond to respective peak values, and the peak detector 23B transmits the frequency points to the frequency resolution processing unit 22B.

The frequency resolution processing unit 22B transmits the complex number data in the ascent and the descent to the direction estimating unit 30.

The complex number data are set as the target groups in the ascent and the descent, in which the target group includes the beat frequencies having peak values in the ascent and the descent.

In a target link unit 32B, it is required to make association between a past target having been determined in the past detecting cycle and two target groups in the ascent and the descent, so the memory 21 stores the data table shown in FIG. 24.

The target link unit 32B performs a target connection process similar to that performed by the target link unit 32 of FIG. 1. The target connection process makes the associations between the present detecting cycle and the past detecting cycles.

The direction estimating unit 30 performs the data generation process and the averaging process for the AR coefficients in the ascent, which are indicated in the first embodiment through the third embodiment.

Further, the direction estimating unit 30 detects an angle θ for each of AR coefficients of the ascent and the descent, and transmits the angle θ to the peak combination unit 24B as data in tables of FIG. 25.

Thus, the peak combination unit 24B combines data having similar angles based on the information on the tables of FIGS. 25A and 25B. Further, the peak combination unit 24B combines the beat frequencies in the ascent and the descent. The peak combination unit 24B transmits the obtained combination to the distance detection unit 25 and the velocity detection unit 26.

Similar to the case of the first embodiment, the distance detection unit 25 calculates distances based on the combination for the beat frequencies in the ascent and in the descent.

Similar to the case of the first embodiment, the velocity detection unit 26 calculates a relative velocity based on the combination for the beat frequencies at the ascent and at the descent.

Each of the distance detection unit 25 and the velocity detection unit 26 does not include a filtering process which is based on the averaging process of the present detecting cycle and the past detecting cycle, unlike the case of detecting directions. Each of the distance detection unit 25 and the velocity detection unit 26 calculates the distances and the relative velocity, respectively, based on the combination for the beat frequencies at the ascent and at the descent.

The targeting unit 31B determines the AR coefficients, the frequency points, the distances and the relative velocities in the ascent and the descent as a present state.

Further, the target link unit 32B stores the frequency points and the AR coefficients in the ascent and the descent, the distance, the longitudinal position, the lateral position, the relative velocity into the table of FIG. 24 for each target using the similar data process of the first embodiment.

In the present embodiment, the table in FIG. 22 may store not only the AR coefficients, but also the generative complex number data indicating the peak value of the beat frequency or the covariance matrix and the right hand side vector.

Fifth Embodiment

An electronic scanning radar apparatus of the fifth embodiment will be explained below.

Figure 26:
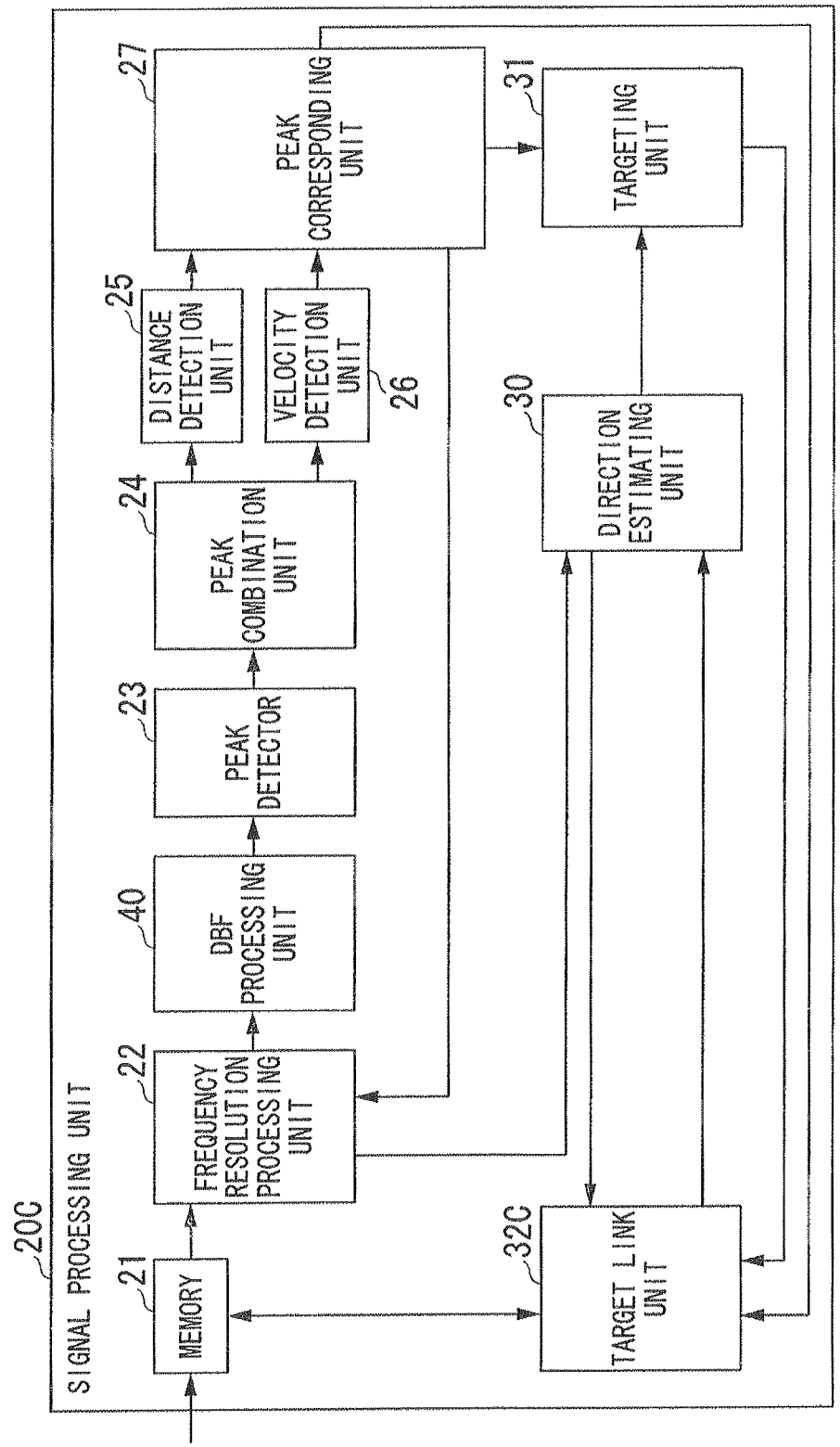
FIG. 26 is a block diagram that illustrates an electronic scanning radar apparatus in accordance with a fifth preferred embodiment of the present invention.

FIG. 26 is a block diagram illustrating a signal processing unit 20D of an electronic scanning radar apparatus in accordance with the fifth embodiment of the present invention.

Unlike the first embodiment, in the fifth embodiment, the signal processing unit 20D preliminarily performs a direction estimation using a DBF (Digital Beam Forming) method having a resolution which is low compared to that of an algorithm with a high resolution such as the AR spectral estimation process or the like. Then, the direction estimation is performed with a high resolution algorithm based on the AR spectral estimation process which uses the averaged AR coefficients.

In the present embodiment, for portions which are similarly used in the case of the first embodiment shown in FIG. 1, identical symbols are assigned. In the following, a description will be made for the different points from the case of the first embodiment.

As shown in FIG. 24, a DBF processing unit 40 is provided between the frequency resolution processing unit 22 and the peak detector 23 of FIG. 1, and the direction of an incoming wave is preliminarily detected with the DBF processing unit 40, which is different from the case of the first embodiment as described above.

Similar to the case of the first embodiment, the frequency resolution processing unit 22 performs frequency resolution (temporal Fourier transformation) for the beat signal to be input, and transmits the frequency points indicating beat frequencies and the complex number data to the DBF processing unit 40.

Subsequently, the DBF processing unit 40 performs Fourier transformation of the complex number data of each antenna receiving signals along the direction where the antennas are arranged, that is, Spatial Fourier transformation is performed.

Further, the DBF processing unit 40 calculates spatial complex number data depending on angles, which are the complex number data of each angle according to an angle resolution. The DBF processing unit 40 transmits the obtained spatial data to the peak detector 23 for each beat frequency.

In this way, a spectrum is formed from spatial complex number data for each angle channel (for each beat frequency), thus the spectrum depends on the incoming direction of a receiving wave. The resolution of the receiving wave depends on the resolution of the beam scanning.

Further, as Fourier Transformation is performed for the arranged direction of the antennas, an obtained result can be expected to include the same effect as if data are obtained by adding the complex number data between the channel angles. Therefore, an S/N (signal-to-noise) ratio of the complex number data for each angle channel can be improved, and thus it becomes capable of improving the detection accuracy of a peak, similar to the case of the first embodiment.

Similar to the first embodiment, the complex number data and the spatial complex number data are obtained for an ascent and a descent.

The peak detector 23 performs the detection of a peak for each of the angle channels based on the result of the data processing of the peak detector 23 after the processing of the DBF processing unit 40. Further, the peak detector 23 transmits each of the detected data to the peak combination unit 24 for each of the angle channels. Therefore, when the spatial Fourier Transformation is performed with sixteen resolutions, the number of angle channels becomes 15.

Similar to the case of the first embodiment, the peak combination unit 24 combines the beat frequencies having peak values in the ascent and the descent and their peak values. Then, the peak combination unit 24 transmits the combined results to the distance detection unit 25 and the velocity detection unit 26 for each of the angle channels.

Further, the peak corresponding unit 27 generates a table of FIG. 5 for each angle channel based on the distance r and the relative velocity v received in order from the distance detection unit 25 and the velocity detection unit 26. Subsequently, the peak corresponding unit 27 determines, for each channel, appropriate combinations between peaks of individual targets in the ascent and the descent, which is similar to the case of the first embodiment. In this case, as the resolution of the DBF indicates the existence of a target over plural angle channels, the corresponding unit 27 performs appropriate combinations between peaks of individual targets in the ascent and the descent by takes into account the neighboring angle channels (matrix). Then, the corresponding unit 27 determines a pair of peaks in the ascent and the descent, and transmits the target group number to the targeting unit 31 with indicating a determined velocity r and a determined relative velocity v. Thus, the table of FIG. 25 is formed.

FIG. 27 illustrates a data table which includes data such as distances, vertical positions, lateral positions, and relative velocities which have been determined by the combination process of data peaks between the ascent and the descent.

The corresponding unit 27 can obtain not only the distances r and the relative velocities r but also information on angle channels of each of targets, so that the corresponding unit 27 creates the data table of FIG. 27, which indicates the result of each target group at the present detecting cycle including the longitudinal positions and the lateral positions in addition to the data table of FIG. 6.

Further, the target link unit 32C performs a combination process which associates between a target of the present detecting cycle and a target of the past detecting cycles of FIG. 17 using the information on the table of FIG. 27. In this case, as combination parameters, a vertical position and lateral position are used in addition to a distance, a relative velocity and a peak frequency point, it becomes possible to improve the accuracy of the combination process.

The direction estimating unit 30 performs the data generation and the averaging process indicated in the first through third embodiments.

Further, the target link unit 32 can improve the reliability of detecting directions by estimating the direction based on a logical AND operation between the direction information received from the detection estimating unit 30 and the direction information received from the DBF processing unit 40. Also, individual information on the directions can be shared for use. For example, when the targets are positioned within a close distance, the information on the DBF processing unit 40 may be used because the angle resolution may be rough when the target is close.

Sixth Embodiment

An electronic scanning radar apparatus in accordance with a sixth embodiment will be described below.

Figure 28:
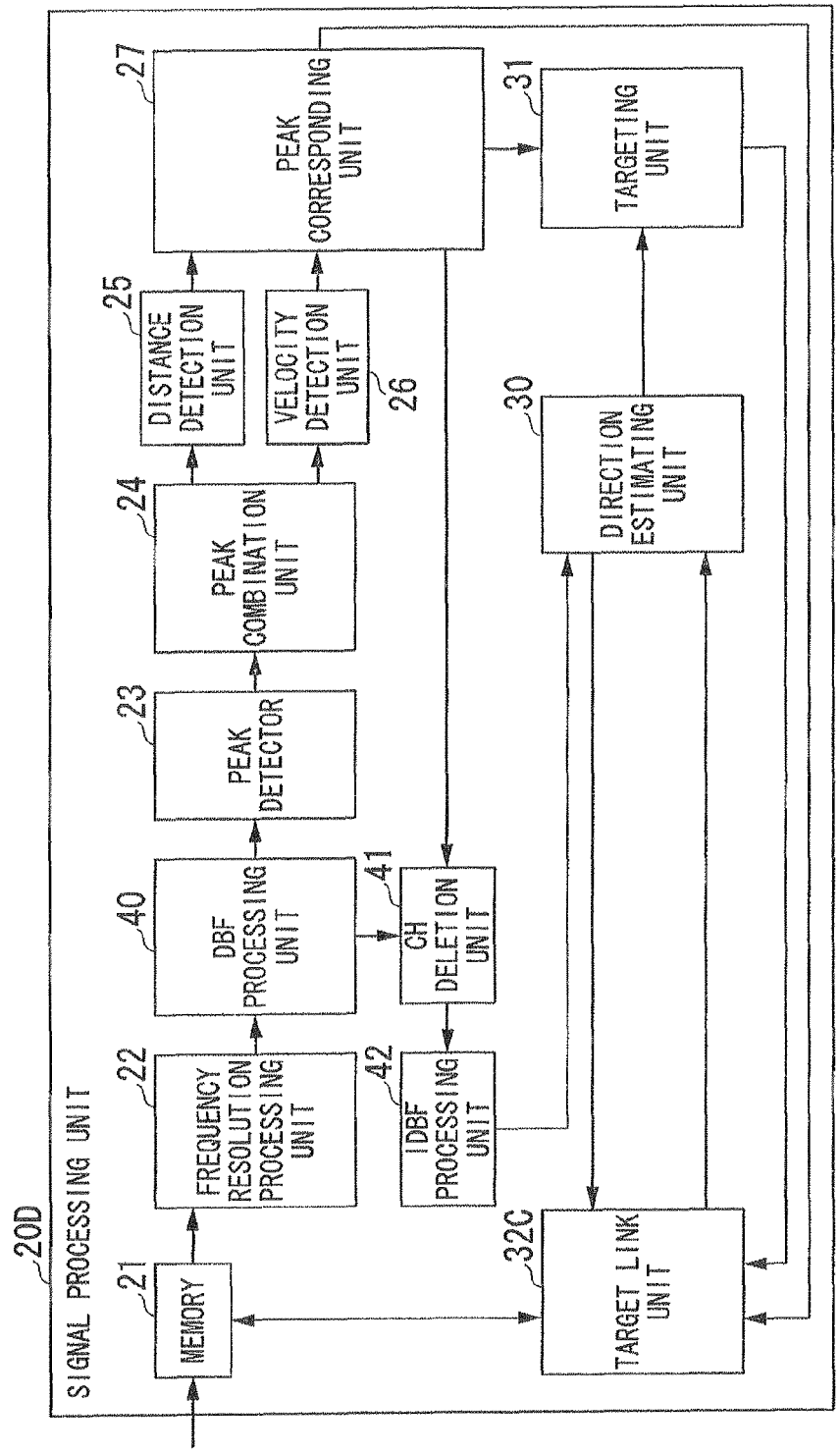
FIG. 28 is a block diagram that illustrates an electronic scanning radar apparatus in accordance with a sixth preferred embodiment of the present invention.

FIG. 28 is a block diagram illustrating an electronic scanning radar apparatus in accordance with the sixth preferred embodiment of the present invention.

Unlike the first embodiment, in the sixth embodiment, the electronic scanning radar apparatus preliminarily performs a direction estimation based on a DBF (Digital Beam Forming) method having a resolution which is low compared to that of an algorithm with a high resolution such as the AR spectral estimation process or the like. The electronic scanning radar apparatus narrows the angle range of a target, and performs an inverse digital beam forming (IDBF, or Inverse Spatial Fourier Transformation), returning the data obtained from the frequency resolution processing unit 22 to the complex number data on the frequency axis, in order to improve the accuracy of a following direction estimation which is performed by a high resolution algorithm. In the present embodiment, identical symbols are assigned for portions which are similarly used in the case of the fifth embodiment shown in FIG. 26. In the following, an explanation will be given for the points different from the case of the fifth embodiment.

In the sixth embodiment, additional units, a channel deletion (Ch-deletion) unit 41 and an IDBF processing unit 42 are added to the signal processing unit 20D of the fifth embodiment.

Similar to the fifth embodiment, the DBF processing unit 40 performs the Spatial Fourier Transformation of data, and transmits the spatial complex number data to the Ch-deletion unit 41 as well as to the peak detector unit 23.

As shown in FIG. 27A, the DBF processing unit 40 performs the Spatial Fourier Transformation with 16 point resolutions in the arranged direction of the receiving antennas, resulting a spectrum of 15 angle channels as a function of the angles. Then, the DBF processing unit 40 transmits the obtained spectrum to the Ch-deletion unit 41.

The Ch-deletion unit 41 detects signal levels if the signal levels (spectrum levels) exist adjacently and continuously within a predetermined angle range, and if the signal levels exceed a predetermined DBF threshold level. Each of the signal levels indicates the spatial complex number data. The spatial complex number data correspond to a peak frequency point (for example, at a descent) of a DBF target, which has been preliminary determined by the peak corresponding unit 27. Further, the Ch-deletion unit 41 replaces the rest of the signal levels being less than the predetermined DBF threshold by "0." The Ch-deletion unit 41 transmits the obtained spatial complex number data to the Ch-deletion unit 41, in which the obtained spatial complex number data correspond to signal levels "0" and the retained signal levels of the angle channels. The obtained spatial complex number data may be referred to as the narrowed data.

Figure 29A:
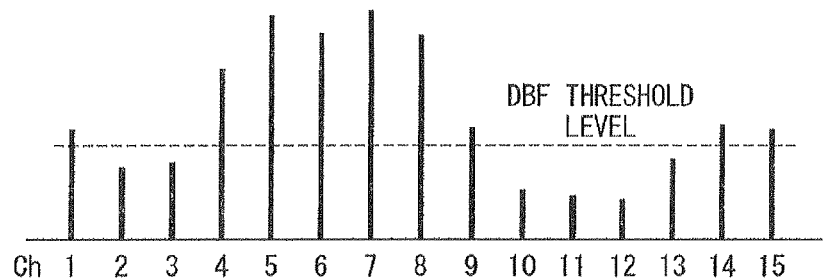
FIG. 29A is a conceptual drawing that illustrates a data processing performed for the spectrum intensity at fifteen angle channels, for example.
Figure 29B:
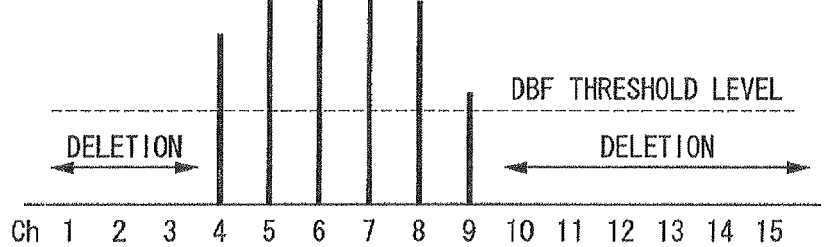
FIG. 29B is a conceptual drawing that illustrates a data processing performed for the spectrum intensity at each angle channel in FIG. 29A.

In the process described above, for example, if adjacent six angle channels have signal levels exceeding the predetermined DBF threshold level as shown in FIG. 29B, the Ch-deletion unit 41 determines that targets more than one exist in the range, and replaces the rest of the signal levels of the other angle channels by "0". This procedure may be referred to as a spectrum narrowing process.

Further, the IDBF processing unit 42 performs the spatial inverse Fourier Transformation for the spatial complex number data obtained by the spectrum narrowing process, converts the converted data to complex number data of the frequency axis, and then transmits the complex number data to the direction estimating unit 30.

Figure 29C:
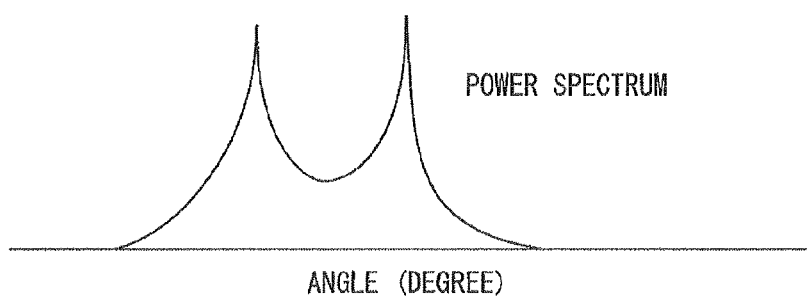
FIG. 29C is a conceptual drawing that illustrates a data processing performed for the spectrum intensity at each angle channel in FIG. 29B.

Further, the direction estimating unit 30 calculates a normal equation from the complex number data to be input, so that the direction estimating unit 30 can obtain the normal equation, which eliminates obstacles on the road side and reduces noises. FIG. 29C indicates an example that a normal equation is obtained from a target group of the DBF resolution of FIG. 29B by use of the method described above and targets are separated by the high resolution algorithm. The term of "target group" is used for targets because there could be more than one or plural targets to be detected in the actual case.

Figure 30A:
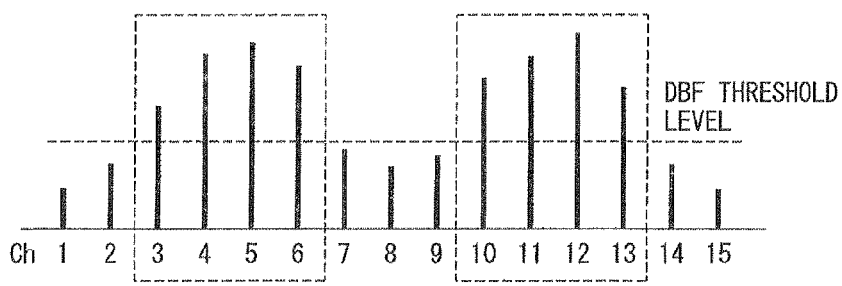
FIG. 30A is a conceptual drawing that illustrates a data processing performed for the spectrum intensity at each angle channel.

As shown in FIG. 30A, when the electronic scanning radar apparatus receives receiving waves with reflections from plural targets, the complex number data received from the DBF processing unit 40 will include a plurality of ranges of continuous angle channels where the intensity levels of the continuous angle channels exceed the DBF threshold level.

Figure 30B:
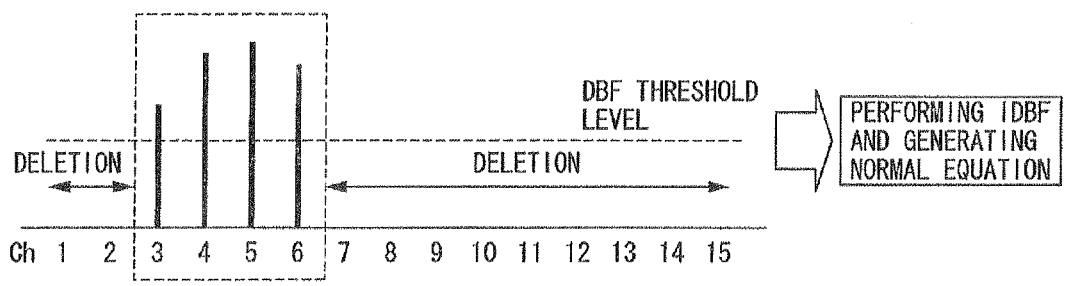
FIG. 30B is a conceptual drawing that illustrates a data processing performed for the spectrum intensity at each angle channel.
Figure 30C:
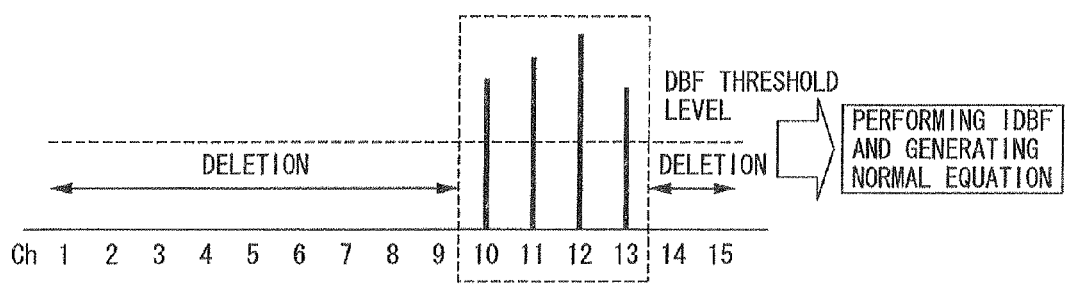
FIG. 30C is a conceptual drawing that illustrates a data processing performed for the spectrum intensity at each angle channel.

When the received complex number data include signal levels for adjacent continuous angle channels, and the signal levels of the adjacent continuous angle channels exceed the DBF threshold level within a predetermined range of angle channels, the Ch-deletion unit 41 extracts the signal levels from the predetermined range and replaces the rest of the signal levels at the rest of the range by "0". Thus, the Ch-deletion unit 41 separates and identifies the individual spatial complex number data for the ranges of angle channels, as shown in FIG. 30B and FIG. 30C.

The peak corresponding unit 27 obtains the distance, the relative velocity, the vertical position and the lateral position, and transmits them to the Ch-deletion unit 41 as well as to the target link unit 32, which is similar to the case of the fifth embodiment.

The Ch-deletion unit 41 selects the spatial complex number data corresponding to the frequency point of a DBF target.

After performing data deletion according to the method described above, the Ch-deletion unit 41 transmits the obtained data to the IDBF processing unit 42.

The IDBF processing unit 42 performs Inverse Spatial Fourier Transformation for the data received from the Ch-deletion unit 41. The IDBF processing unit 42 generates and transmits the IDBF data to the direction estimating unit 30.

The target link unit 32C extracts AR coefficients of the past detecting cycles from the table of FIG. 17 in the memory 21 in response to the receiving data such as the distance, the relative velocity, the vertical position and the lateral position, and transmits the obtained data to the direction estimating unit 30.

According to the data processing described above, the spectrum narrowing process can be made for the range of detecting direction when the spectra are calculated at the AR spectra estimation process of the direction estimating unit 30. This can further improve the resolutions.

Further, the present embodiment becomes equivalent to a case where the direction estimating unit 30 virtually receives a receiving wave divided by each target group for the correlation matrix used to calculate AR coefficients. Thereby, even if the receiving antennas and the sub-array receive the receiving waves of targets more than the number of the receiving antenna and sub-array, it becomes possible to accurately calculate AR coefficients.

The direction estimating unit 30 performs the data generation and data averaging process as indicated in the first through third embodiments.

(Direction Estimation Characteristics of First Through Sixth Embodiments)

Next, a description will be given of the characteristics of the direction estimation in accordance with the first through sixth embodiments.

FIGS. 31A-31B and FIGS. 32A-32B are drawings that illustrate the direction estimation characteristics of the electronic scanning radar apparatuses in accordance with the first through sixth embodiments.

Figure 31A:
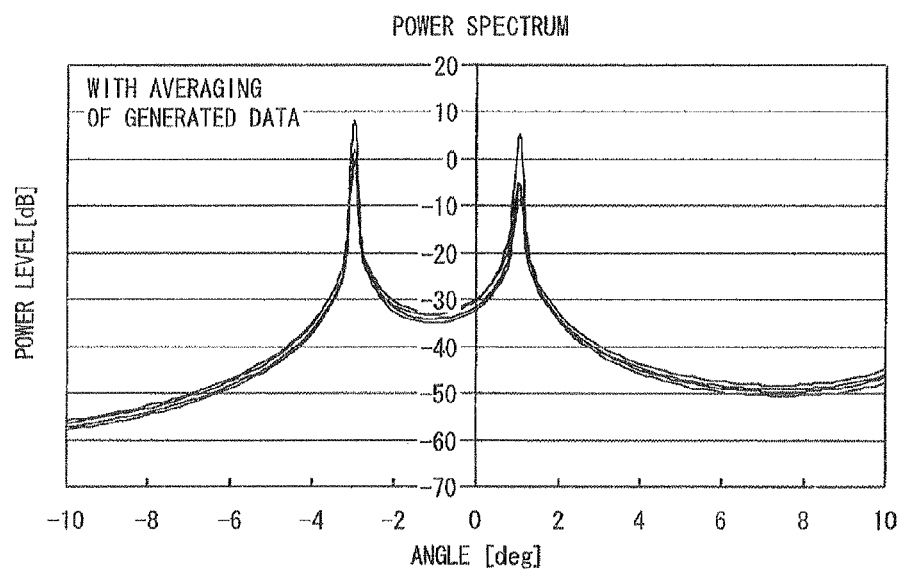
FIG. 31A is a drawing that illustrates the direction estimation characteristics of an electronic scanning radar apparatus in accordance with a preferred embodiment.
Figure 31B:
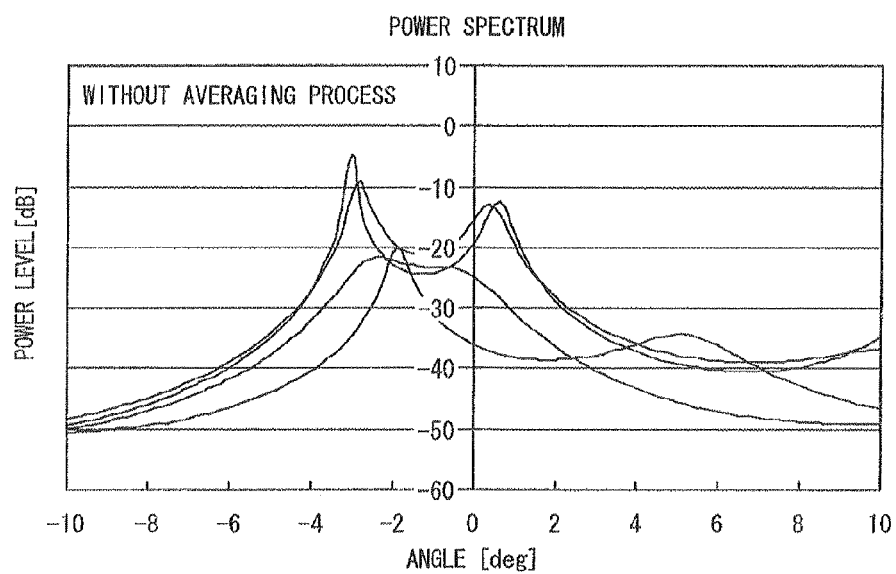
FIG. 31B is a drawing that illustrates power spectrum characteristics obtained by applying an improved covariance method in a usual procedure without an averaging process.

FIG. 31A shows a spectrum estimated by assuming that the order of the normal equation is 3, based on the configuration of the first embodiment. FIG. 31B shows a spectrum estimated by assuming that the order of the normal equation is 3, based on a conventional improved covariance method, in which neither of the averaging process of AR coefficients and the averaging process of normal equations is performed.

Figure 32A:
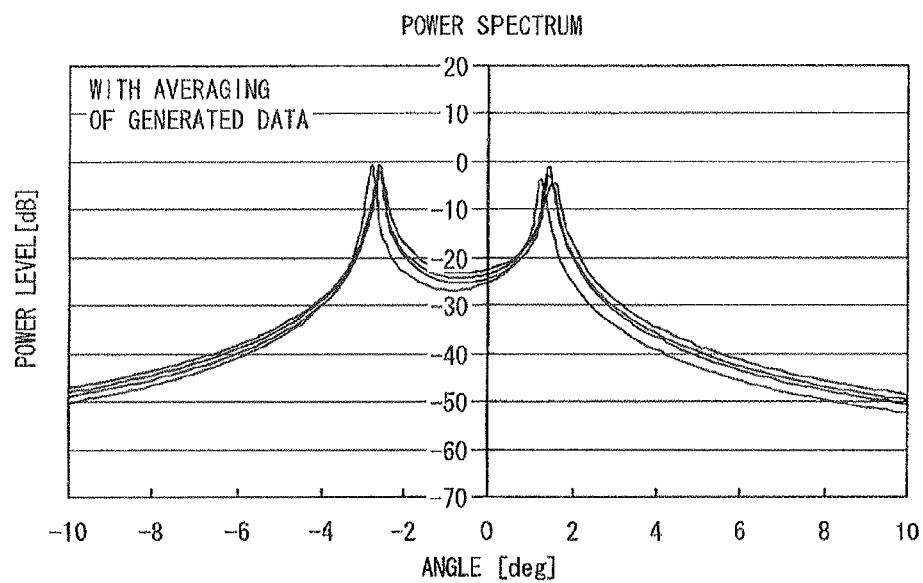
FIG. 32A is a drawing that illustrates the direction estimation characteristics of an electronic scanning radar apparatus in accordance with a preferred embodiment.
Figure 32B:
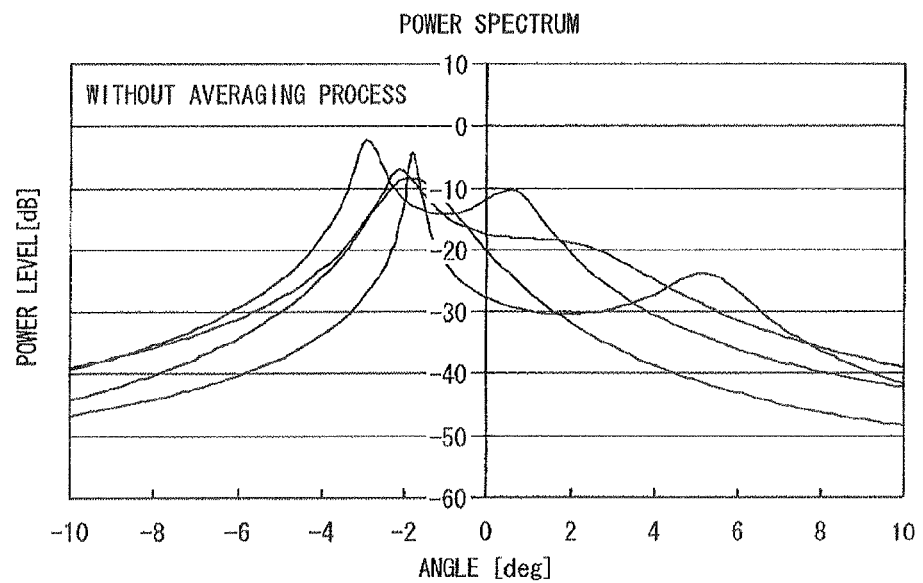
FIG. 32B is a drawing that illustrates power spectrum characteristics obtained without an averaging process.

FIG. 32A shows a spectrum estimated by assuming that the order of the normal equation is 2, based on the configuration of the first embodiment. FIG. 32B shows a spectrum estimated by assuming that the order of the normal equation is 2, based on a conventional improved covariance method, in which neither of the averaging process of AR coefficients and the averaging process of normal equations is performed.

In comparison between the results of FIG. 31A and FIG. 31B, and further comparison between the results of FIG. 32A and FIG. 32B, it can be found that the fluctuations of respective detecting results are reduced by the averaging process of the normal equations based on the generated generative complex number data. Namely, based on the configurations in accordance with the first through sixth embodiments, the shapes of the peaks and the angles can be detected with being paired.

The electronic scanning radar apparatuses in accordance with the first through sixth embodiments can perform the averaging process for either the input elements or the output elements, or the input and output elements of the spectrum estimation process based on the complex number data of detected beat frequencies in the direction estimating unit 30, so that the detection of incoming direction of receiving waves can be performed with high accuracy without reducing the detection accuracy.

Up to now, although the first through sixth embodiments have been explained based on the example configuration used for the FMCW radar indicated in FIG. 1, these embodiments can be applied to the other configurations of antennas of FMCW method.

Further, the present invention can also be applied to other methods excluding the FMCW method, such as the multiple CW method or pulse radar.

In the embodiments of the first through sixth embodiments, although the number of targets and the direction of the targets are obtained by calculating the peaks of power spectrum, in stead, calculations may be executed for solving a high order equation and obtains the poles, so that the pole may be used for the direction estimation.

In the embodiments of the first through sixth embodiments, the target link unit 32 stores a data generation unit into the memory 21, in which the data generation unit is generated in the present detecting cycle that is a detecting cycle performed in the present time in the detecting cycle, and the detecting cycle is repeatedly performed to detect the incoming direction of a receiving wave. The data generation unit is used in a future detecting cycle which is a detecting cycle performed after the present detecting cycle. The target link unit 32 makes association between a present target that is detected in the present detecting cycle and a past target that is detected in a past detecting cycle, where the past detecting cycle is performed in the past before the present detecting cycle is performed. The target link unit 32 stores the data generation unit corresponding to the associated targets into the memory 21. The direction estimating unit 30 generates a generative complex number data so as to correspond to the data generation unit. The generative complex number data is a complex number data generated based on a complex number data that is calculated based on the beat signal. The direction detecting unit 30 calculates the incoming direction of the receiving wave based on normal equations which are respectively generated for each antenna by use of the complex number data of a detected beat frequency that is the beat frequency of which a target is detected and the generative complex number data that is generated so as to correspond to the data generation unit. Further, the direction estimating unit 30 performs an averaging process for at least part of elements that form the normal equation.

In the embodiments of the first through sixth embodiments, the direction estimating unit calculates the AR coefficient. The calculation of AR coefficient is performed based on a normal equation, which is indicated by a linear formation consisting of the correlation matrix used for an autoregressive estimation process, an AR coefficient and elements of a right hand side vector. The calculation of the AR coefficient is performed based on a complex number data, and based on either a first element of a first correlation matrix or a first element of a first normal equation determined by a first right hand side vector. The calculation of the AR coefficient is performed based on the generative complex number data, and based on the second element of a second normal equation which is determined by the second right hand side vector and the second correlation matrix. The calculation of the AR coefficient is performed based on the result of an averaging process performed for the second element corresponding to the first element.

Further, in the embodiments of the first through sixth embodiments, the direction estimating unit (30A) includes a normal equation generation unit 301A that generates a first normal equation and a second normal equation, the AR coefficient calculation unit 302A that leads AR coefficients based on the first normal equation and second normal equation, the spectrum calculation unit 304 that calculates the incoming direction of a receiving wave from a power spectrum obtained based on the AR coefficient, and the data generation unit 308A that generates a generative complex number data led from the complex number data and the AR coefficient.

In addition, in the embodiments of the first through sixth embodiments, the direction estimating unit (30A) includes the normal equation filter unit 306 that calculates the normal equation which the generated first normal equation and the generated second normal equation performed by the averaging process. The AR coefficient calculation unit 302A leads the AR coefficient based on the averaged normal equation.

In the embodiments of the first through sixth embodiments, the normal equation generation unit 301 generates an averaged right hand side vector. The generation of the averaged right hand side vector is based on the present correlation matrix and present right hand side vector which are elements of the normal equation generated in the present cycle, and which are associated with a target. The generation of the averaged right hand side vector is based on the averaged correlation matrix which a weighted averaging process is performed for the present correlation matrix and the past correlation matrix, and based on the weighted averaging process performed for the present right hand side vector and the past right hand side vector. The AR coefficient calculation unit 302A leads the AR coefficient from the normal equation which include the averaged correlation matrix and the averaged right hand side vector as elements.

In the embodiments of the first through sixth embodiments, the AR coefficient calculation unit 302C can calculates an averaged AR coefficient by performing the averaging process for a first and second AR coefficient. The first AR coefficient is generated based on a generated normal equation (a first normal equation), and the second AR coefficient is generated based on a generated generative normal equation (a second normal equation).

In the embodiments of the first through sixth embodiments, the memory 21 stores at least a generative complex number data or part of elements forming the generated normal equation as the data generation unit.

The direction estimating unit 30 makes the target link unit store at least the generated generative complex number data or part of elements of the generated normal equation into the memory 21.

In the embodiments of the first through sixth embodiments, the data generation unit being stored is the AR coefficient.

Further, in the embodiments of the first through sixth embodiments, the memory 21 stores the distance of a target and the relative velocity detected in the past detecting cycle, and the AR coefficient for a target having been associated, by making association among them. The target link unit 32 makes links between a target of the present detecting cycle and a past target of a past detecting cycle that is associated with the present detecting cycle, and the past detecting cycle that relates to the present in time series. The AR coefficient calculation unit 302C generates the averaged AR coefficient by performing the weighted averaging process for the AR coefficients, and associates the distance of the target of the present detecting cycle, the relative velocity and at least one of the AR coefficient or the averaged AR coefficient, with the distance of the past target, the relative velocity of the past detecting cycle and at least one of the AR coefficient or the averaged AR coefficient of the past detecting cycle, so that the AR coefficient calculation unit 302C stores them into the memory 21.

In the embodiments of the first through sixth embodiments, the data generation unit to be stored is a generative complex number data.

Further, a receiving wave direction estimation program may be recorded into computer readable recording media to achieve the functions of signal processing units 20, 20B through 20D in FIGS. 1, 7, 16, 20, 23, 26, and 28. The programs recorded in the media may be read out by a computer system, then the computer executes the signal processing. Thereby, the direction estimation may be performed based on receiving waves. In this case, the "computer system" may include an operation system (OS) and hardware such as a peripheral apparatus or the like. The "computer system" may include a system which can display home pages (or the like) and www ("world wide web") networks. The "computer readable recording media" may include a flexible disk, an optical magnetic disk, ROM, CD-ROM or the like, and a hard drive installed in the computer system. Further, the "computer readable recording media" may include an apparatus such as a server or a volatile memory (RAM or the like) installed in the computer system, which can temporarily store the programs.

Further, the programs described above may be transmitted from a storage device or the like included in the computer system to another computer system via transmission media or a transmission wave in the transmission media. The "transmission media," which transmits the programs, includes a medium which has a function capable of transmitting information, similar to networks such as the internet or the like, and communication lines such as telephone lines or the like. The communication network may include wireless networks. The programs described above may be able to achieve part of the function described above. Further, the functions described above may be used by combination with programs which are already installed in the computer system, i.e., the programs may be differential files or differential programs.

As described above, according to the present invention, an electronic scanning radar apparatus, which is mounted on a moving body, includes a receiving unit configured to include plural antennas that receive a receiving wave coming from a target that reflects a transmitted transmission wave and causes the receiving wave. The electronic scanning radar apparatus also includes a beat signal generation unit that generates beat signals based on the transmission wave and the receiving wave, and a frequency resolution process unit that resolves the beat signals into a predetermined frequency band width and calculates the complex number data based on the beat signals resolved into each of the beat frequencies. The electronic scanning radar apparatus includes a target detecting unit that detects the existence of a target by detecting a peck value from the intensity of the beat frequency. The electronic scanning radar apparatus includes a memory that stores the data generation unit. The data generation unit is generated in the present detecting cycle that is performed in the present time, and used in the next detecting cycle that is performed after the present detecting cycle. The detecting cycles are repeatedly performed to calculate the incoming (receiving) direction of the receiving wave. The electronic scanning radar apparatus includes a target link unit that makes association between a target detected in the present detecting cycle and the target detected in the past detecting cycle that is performed before the present detecting cycle, and stores the data generation unit associated with the target into the memory. The electronic scanning radar apparatus includes a direction estimating unit which generates a generative complex number data to correspond to the data generation unit. The generative complex number data is a complex number data that is generated based on a complex number data calculated from the beat frequency. For each antenna, the generative complex number data is formed to correspond to a complex number data of a detected beat frequency which an existence of a target has been detected, and correspond to the data generation unit. The direction estimating unit calculates the incoming direction of the receiving wave based on each normal equation formed by use of the generative complex number data. The direction estimating unit performs an averaging process for at least part of elements that form the normal equation.

In this way, the direction estimating unit generates, for each antenna, both the incoming direction of the receiving wave based on the normal equation and the information that becomes the elements of a next normal equation for the next time (cycle), where the normal equation is generated by the complex number data of the detected beat frequency which an existence of a target has been detected, and the complex number data that is formed based on a complex number data. Thus, it becomes possible to provide the electronic scanning radar apparatus and the receiving wave direction estimation program, which can accurately detect the incoming direction of the receiving wave without reducing the detecting accuracy.

What is claimed is:

1. An electronic scanning radar apparatus, which is mounted on a moving body, comprising:
    a receiving unit configured to include a plurality of antennas receiving a receiving wave coming from a target, the target reflecting a transmission wave having been transmitted;
    a beat signal generation unit configured to generate beat signals in response to the transmission wave and the receiving wave;
    a frequency resolution processing unit configured to resolve the beat signals into beat frequencies having a predetermined frequency band width, the frequency resolution processing unit calculating a complex number data based on the beat signals resolved for each of the beat frequencies;
    a target detecting unit configured to detect a peak value from intensity values of the beat frequencies so that the target detecting unit detects an existence of the target;
    a memory unit configured to store a data generation unit, the data generation unit being generated in a present detecting cycle that is performed in a present time and used in a next detecting cycle that is performed after the present detecting cycle, the present and next detecting cycles being repeatedly performed to calculate an incoming direction of the receiving wave;
    a target link unit configured to make association between a target detected in the present detecting cycle and the target detected in the past detecting cycle that is performed before the present detecting cycle and store the data generation unit associated with the target into the memory; and
    a direction estimating unit configured to generate a generative complex number data to correspond to the data generation unit, the generative complex number data being generated based on a complex number data calculated from the beat frequencies, the direction estimating unit calculating, for each antenna, an incoming direction of the receiving wave based on each normal equation formed by use of the generative complex number data, the generative complex number data being formed to correspond to the complex number data of a detected beat frequency that is the beat frequency which an existence of the target has been detected and the data generation unit,
    wherein the direction estimating unit performs an averaging process for at least part of elements that form the normal equation.

2. The electronic scanning radar apparatus as claimed in claim 1,
    wherein, for the normal equation indicated by a linear form consisting of elements of a right hand side vector, an AR coefficient and a correlation matrix used in an autoregressive estimation process, based on the complex number data and based on either a first correlation matrix or a first element of a first normal equation determined by a first right hand side vector and the generative complex number data, for a second element of a second normal equation which determines a second correlation matrix and a second right hand side vector, the direction estimating unit calculates the AR coefficient based on a result of an averaging process performed for the second element corresponding to the first element.

3. The electronic scanning radar apparatus as claimed in claim 2,
    wherein the direction estimating unit comprises:
    a normal equation generation unit that generates the first normal equation and the second normal equation;
    an AR coefficient calculation unit that generates the AR coefficient based on the first normal equation and the second normal equation;
    a spectrum calculation unit that calculate the incoming direction of the receiving wave from a power spectrum led based on the AR coefficient; and
    a data generation unit that generates the generative complex number data led from the complex number data and the AR coefficient.

4. The electronic scanning radar apparatus as claimed in claim 3,
    wherein the direction estimating unit further comprises:
    a normal equation filter configured to calculate an averaged normal equation obtained by performing the averaging process for the first normal equation and the second normal equation, and
    wherein the AR coefficient calculation unit leads the AR coefficient based on an averaged normal equation.

5. The electronic scanning radar apparatus as claimed in claim 3,
    when a present correlation matrix and the right hand side vector become elements of a present normal equation generated in the present time, and a past correlation matrix and the right hand vector become elements of the normal equation generated in the present time based on past information,
    the normal equation generation unit generates an averaged correlation matrix and an averaged right hand side vector, being associated the target,
    the averaged correlation matrix is generated based on the averaging process with weighing performed for the present correlation matrix and the past correlation matrix, and the averaged right hand side vector is generated based on the averaging process with weighting performed for the present right hand side vector and the past right hand vector, the AR coefficient calculation unit leads the AR coefficient from the normal equation having the averaged correlation matrix and the averaged right hand side vector as elements.

6. The electronic scanning radar apparatus as claimed in claim 3,
wherein the AR coefficient calculation unit calculates an averaged AR coefficient by performing the averaging process for the first AR coefficient generated based on the generated first normal equation and the second AR coefficient generated based on the generated second normal equation.

7. The electronic scanning radar apparatus as claimed in claim 1,
wherein the memory unit stores at least either the generative complex number data or part of elements of the generated normal equation as the data generation unit, and
the direction estimating unit stores at least either the generative complex number data or part of elements of the generated normal equation into the memory unit by use of the target link unit.

8. The electronic scanning radar apparatus as claimed in claim 2, wherein the data generation unit is the AR coefficient.

9. The electronic scanning radar apparatus as claimed in claim 7, wherein the data generation unit is the AR coefficient.

10. The electronic scanning radar apparatus as claimed in claim 3,
wherein, for the target being associated, the memory unit stores a past distance of the target and a past relative velocity detected in the past detecting cycle and the AR coefficient making association among them,
the target link unit links between a target of the present detecting cycle and a past target of a past detecting cycle associated with the present detecting cycle and related to the present in time series, and
the AR coefficient calculation unit generates the averaged AR coefficient by performing the averaging process with weighting for the AR coefficient, and associates the distance of the target of the present detecting cycle, the relative velocity and at least one of the AR coefficient or the averaged AR coefficient with the distance of the past target of the past detecting cycle, the relative velocity and at least one of the AR coefficient or the averaged AR coefficient of the past detecting cycle, and then the AR coefficient calculation unit stores them into the memory.

11. The electronic scanning radar apparatus as claimed in claim 7,
wherein, for the target being associated, the memory unit stores the past distance of the target and the past relative velocity detected in the past detecting cycle and the AR coefficient with making association among them,
the target link unit links between the target of the present detecting cycle and the past target of the past detecting cycle associated with the present detecting cycle, and the past detecting cycle relates to the present in time series, and
the AR coefficient calculation unit generates the averaged AR coefficient by performing the averaging process with weighting for the AR coefficient, and associates the distance of the target of the present detecting cycle, the relative velocity and at least one of the AR coefficient or the averaged AR coefficient with the distance of the past target, the relative velocity of the past detecting cycle and at least one of the AR coefficient or the averaged AR coefficient of the past detecting cycle, and then the AR coefficient calculation unit stores them into the memory.

12. The electronic scanning radar apparatus as claimed in claim 1, wherein the data generation unit that is stored into the memory is the generative complex number data.

13. The electronic scanning radar apparatus as claimed in claim 1,
wherein when the target link unit makes association between the present target detected in the present detecting cycle and the past target detected in the past detecting cycle, the target link unit detects whether the present target of the present detecting cycle and the past target of the past detecting cycle are associated each other or not according to a result of whether or not a present distance and a present relative velocity obtained from the detected beat frequency of the present detecting cycle are respectively within a distance range and a relative velocity range calculated from a past distance and a past relative velocity obtained in the past detecting cycle.

14. The electronic scanning radar apparatus as claimed in claim 1, further comprising:
a DBF unit configured to detect a direction and existence of the target based on a digital beam forming that improves a detecting sensitivity of a desired direction receiving the receiving wave based on the complex number data,
wherein the target detecting unit detects the direction of the target based on the digital beam forming of the beat frequency in the present detecting cycle, and
the target link unit makes association between the present target of the present detecting cycle and the past target of the past detecting cycle based on a distance, a relative velocity and a direction.

15. The electronic scanning radar apparatus as claimed in claim 14,
wherein the DBF unit calculates a spatial complex number data indicating an intensity of a spectrum for each angle channel corresponding to a predetermined direction preset based on the digital forming beam,
the DBF unit further includes
a channel deletion unit configured to detect an existence of a DBF target when spectrum intensities of adjacent angle channels of a predetermined angle channel range exceed a predetermined DBF threshold value, the channel deletion unit rewriting the spectrum intensities of the angle channels which the existence of the target is not detected with "0" and transmitting a resulting data as a new spatial complex number data; and
an IDBF unit configured to generate a regenerated complex number data by performing an inverse digital beam forming for the new spatial complex number data, and
the normal equation generation unit generates the normal equation from the regenerated complex number data.

16. The electronic scanning radar apparatus as claimed in claim 14,
wherein the channel deletion unit divides, when having detected plural DBF targets, a spectrum into respective angle channels corresponding to each of the DBF targets and generates the spatial complex number data for a number of the DBF targets,
the IDBF unit generates the regenerated complex number data for each of the DBF targets by performing the inverse digital beam forming for the spatial complex number data for each of the DBF targets, and
the normal equation generation unit calculates the normal equation for each of the DBF targets based on the regenerated complex number data for each of the DBF targets.

17. A receiving wave direction estimation method by use of an electronic scanning radar apparatus that is mounted on a moving body comprising:

transmitting a transmission wave from a transmission unit;

receiving a receiving wave coming from a target by a receiving unit configured to include a plurality of antennas, the target reflecting the transmission wave that is transmitted from the transmission unit;

generating beat signals from the transmission wave and the receiving wave by a beat signal generation unit;

storing a data generation unit into a memory unit, the data generation unit being generated in a present detecting cycle that is performed in a present time and used in a next detecting cycle that is performed after the present detecting cycle, the present and next detecting cycles being repeatedly performed to calculate an incoming direction of the receiving wave;

making association between a target detected in the present detecting cycle and the target detected in the past detecting cycle that is performed before the present detecting cycle and storing the data generation unit associated with the target into the memory;

generating a generative complex number data to correspond to the data generation unit, the generative complex number data being generated based on a complex number data calculated from the beat frequencies; and calculating, for each antenna, an incoming direction of the receiving wave based on each normal equation formed by use of the generative complex number data, the generative complex number data being formed to correspond to the complex number data of a detected beat frequency that is the beat frequency which an existence of the target has been detected and the data generation unit, wherein calculating the incoming direction includes an averaging process that is performed for at least part of elements that form the normal equation.

18. A computer program embodied on a non-transitory computer readable medium causing a computer to control operations of an electronic scanning radar apparatus that is mounted on a moving body, which estimates a receiving wave direction, comprising:

transmitting a transmission wave from a transmission unit;

receiving a receiving wave coming from a target by a receiving unit, the target reflecting the transmission wave;

generating beat signals from the transmission wave and the receiving wave by a beat signal generation unit;

resolving the beat signals into beat frequencies having a predetermined frequency band width and calculating a complex number data by a frequency resolution processing unit;

detecting a peak value from intensity values of the beat frequencies so as to detect an existence of the target by a target detecting unit;

storing a data generation unit into a memory unit, the data generation unit being generated in a present detecting cycle that is performed in a present time and used in a next detecting cycle that is performed after the present detecting cycle, the present and next detecting cycles being repeatedly performed to calculate an incoming direction of the receiving wave;

making association between a target detected in the present detecting cycle and the target detected in the past detecting cycle that is performed before the present detecting cycle and storing the data generation unit associated with the target into the memory;

generating a generative complex number data to correspond to the data generation unit, the generative complex number data being generated based on a complex number data calculated from the beat frequencies; and calculating, for each antenna, an incoming direction of the receiving wave based on each normal equation formed by use of the generative complex number data, the generative complex number data being formed to correspond to the complex number data of a detected beat frequency that is the beat frequency which an existence of the target has been detected and the data generation unit, wherein calculating the incoming direction includes an averaging process that is performed for at least part of elements that form the normal equation.

* * * * *